(12) United States Patent
Karjala et al.

(10) Patent No.: US 8,629,214 B2
(45) Date of Patent: Jan. 14, 2014

(54) ETHYLENE-BASED POLYMER COMPOSITIONS FOR USE AS A BLEND COMPONENT IN SHRINKAGE FILM APPLICATIONS

(75) Inventors: Teresa P. Karjala, Lake Jackson, TX (US); Rongjuan Cong, Lake Jackson, TX (US); Colleen M. Tice, Houston, TX (US); Sarah M. Hayne, Houston, TX (US); Mehmet Demirors, Pearland, TX (US); Lori L. Kardos, Lake Jackson, TX (US)

(73) Assignee: Dow Global Technologies LLC., Midland, MI (US)

( * ) Notice: Subject to any disclaimer, the term of this patent is extended or adjusted under 35 U.S.C. 154(b) by 0 days.

(21) Appl. No.: 13/453,541

(22) Filed: Apr. 23, 2012

(65) Prior Publication Data

US 2012/0277380 A1    Nov. 1, 2012

Related U.S. Application Data

(63) Continuation-in-part of application No. 12/814,902, filed on Jun. 14, 2010, now abandoned.

(60) Provisional application No. 61/222,371, filed on Jul. 1, 2009.

(51) Int. Cl.
  *C08F 8/00*  (2006.01)
  *C08L 23/04*  (2006.01)

(52) U.S. Cl.
  USPC .......................................... 525/191; 525/240

(58) Field of Classification Search
  USPC .................................................. 525/240, 191
  See application file for complete search history.

(56) References Cited

U.S. PATENT DOCUMENTS

| | | | |
|---|---|---|---|
| 3,485,706 | A | 12/1969 | Evans |
| 4,322,027 | A | 3/1982 | Reba |
| 4,340,563 | A | 7/1982 | Appel et al. |
| 4,413,110 | A | 11/1983 | Kavesh et al. |
| 4,663,220 | A | 5/1987 | Wisneski et al. |
| 4,668,566 | A | 5/1987 | Braun |
| 5,844,045 | A | 12/1998 | Kolthammer et al. |
| 5,869,575 | A | 2/1999 | Kolthammer et al. |
| 6,407,191 | B1 | 6/2002 | Mezquita et al. |
| 6,448,341 | B1 | 9/2002 | Kolthammer et al. |
| 6,538,070 | B1 | 3/2003 | Cardwell et al. |
| 6,545,088 | B1 | 4/2003 | Kolthammer et al. |
| 6,566,446 | B1 | 5/2003 | Parikh et al. |
| 2004/0010103 | A1 | 1/2004 | Boussie et al. |
| 2005/0020778 | A1 | 1/2005 | DeGroot et al. |
| 2005/0261510 | A1 | 11/2005 | Graf et al. |
| 2007/0117946 | A1 | 5/2007 | Schwab et al. |
| 2007/0219327 | A1 | 9/2007 | Beigzadeh et al. |
| 2008/0125553 | A1 | 5/2008 | Conrad et al. |
| 2010/0056727 | A1* | 3/2010 | LiPiShan et al. ............. 525/240 |
| 2010/0087606 | A1 | 4/2010 | Karjala et al. |
| 2010/0317804 | A1 | 12/2010 | Karjala et al. |
| 2011/0178253 | A1 | 7/2011 | Karjala et al. |

FOREIGN PATENT DOCUMENTS

| | | |
|---|---|---|
| EP | 0928797 A1 | 7/1999 |
| EP | 1529633 A1 | 5/2005 |
| WO | 02/074817 A2 | 9/2002 |
| WO | 2006081116 A1 | 8/2006 |
| WO | 2007/136493 A2 | 11/2007 |
| WO | 2007136496 A2 | 11/2007 |
| WO | 2009/067337 A1 | 5/2009 |
| WO | 2011/002868 A2 | 1/2011 |
| WO | 2011/002986 A1 | 1/2011 |

OTHER PUBLICATIONS

B Monrabal et al, Macromol. Symp. 257, 71-79, 2007.
Balke, Mourey, et al., Chromatography Polym., Chapter 12, 1992.
Balke, Thitiratsakul, Lew, Cheung, Mourey, Chromatography Polym., Chapter 13, 1992.
Busico, V. Et al. Macromolecules, vol. 38, 6988, 2005.
Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. "Detection of low levels of long-chain branching in polyolefins." Annual Technical Conference, Society of Plastics Engineers (2008), 66th, p. 887-891.
L. Wild, R.T. Ryle et al., J. Polymer Science Polymer Physics Edition 20, 441-455(1982).
PCT/ US2011/027912, Article 19 Response.
PCT/US2010/040575 20110325 RA Search Report and Written Opinion.
PCT/US2010/040575 20111014 RA International Preliminary Report on Patentability.
PCT/US2010/044389, International Preliminary Report on Patentability.
PCT/US2010/044389, International Search Report and Written Opinion.
PCT/US2011/027912, International Search Report & Written Opinion of the International Searching Authority.
Schouterden and G. Groeninckx, "Fractionation and thermal behavior of linear low density polyethylene", Polymer 1987 vol. 28, p. 2099-2104.
Williams and Ward, J. Polym. Sci., Polym. Let., 6, 621 (1968).
Yau, Wallace W., "Examples of Using 3D-GPC-TREF for Polyolefin Characterization", Macromol. Symp., 2007, 257, 29-45.
Zimm, B.H., J. Chem. Phys., 16, 1099, 1948.

\* cited by examiner

*Primary Examiner* — Nathan M Nutter

(57) ABSTRACT

An ethylene-based polymer composition has been discovered and is characterized by a Comonomer Distribution Constant greater than about 45. The new ethylene-based polymer compositions and blends thereof with one or more polymers, such as LDPE, are useful for making many articles, especially including films.

16 Claims, 15 Drawing Sheets

```
;lc1prf2_zz
prosol relations=<lcnmr>
#include <Avance.incl>

"d12=20u"
"d11=4u"

1 ze
d12 pl21:f2
2 30m
d13
d12 pl9:f1
d1 cw:f1 ph29 cw:f2 ph29
d11 do:f1 do:f2
d12 pl1:f1
p1 ph1
go=2 ph31
30m mc #0 to 2 F0(zd)
exit ph1=0 2 2 0 1 3 3 1
ph29=0
ph31=0 2 2 0 1 3 3 1
```

Figure 2

| Group | Structure | Notation |
|---|---|---|
| Vinylene | | Vinylene1 |
| | | Vinylene2 |
| | | Vinylene3 |
| Trisubstituted unsaturation | | Trisubstituted |
| Vinyl | | Vinyl1 |
| | | Vinyl2 |
| Vinylidene | | Vinylidene1 |
| | | Vinylidene2 |
| | | Vinylidene3 |

Vinyl3

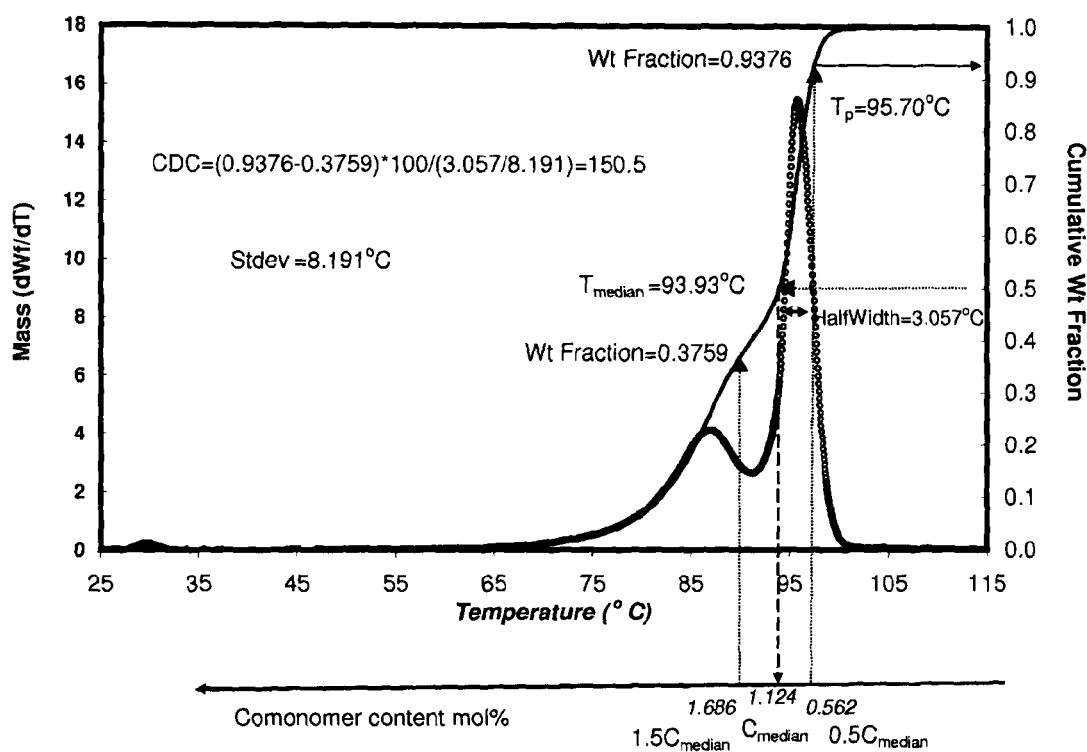
Figure 4: Comonomer distribution profile for Example 1.

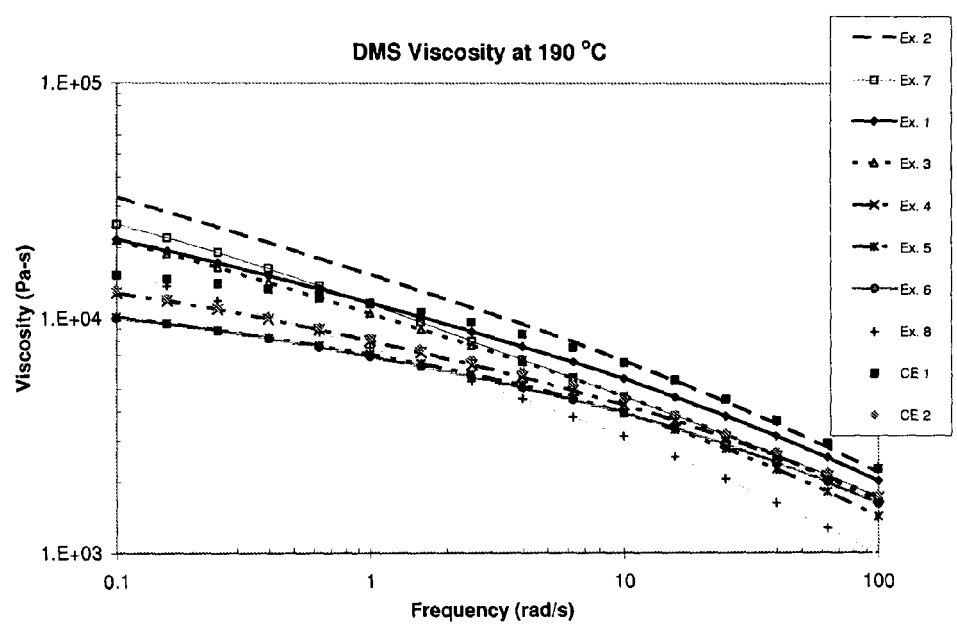
Figure 5. Dynamical mechanical spectroscopy complex viscosity data versus frequency for Examples and Comparative Examples.

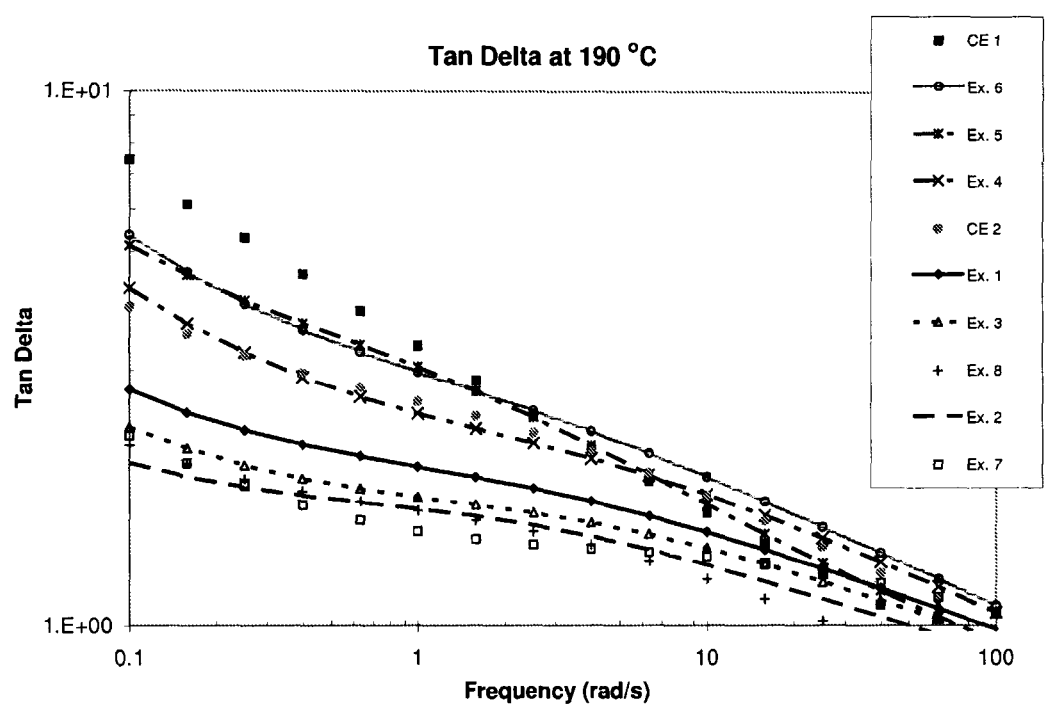
Figure 6. Dynamical mechanical spectroscopy tan delta data versus frequency for Examples and Comparative Examples.

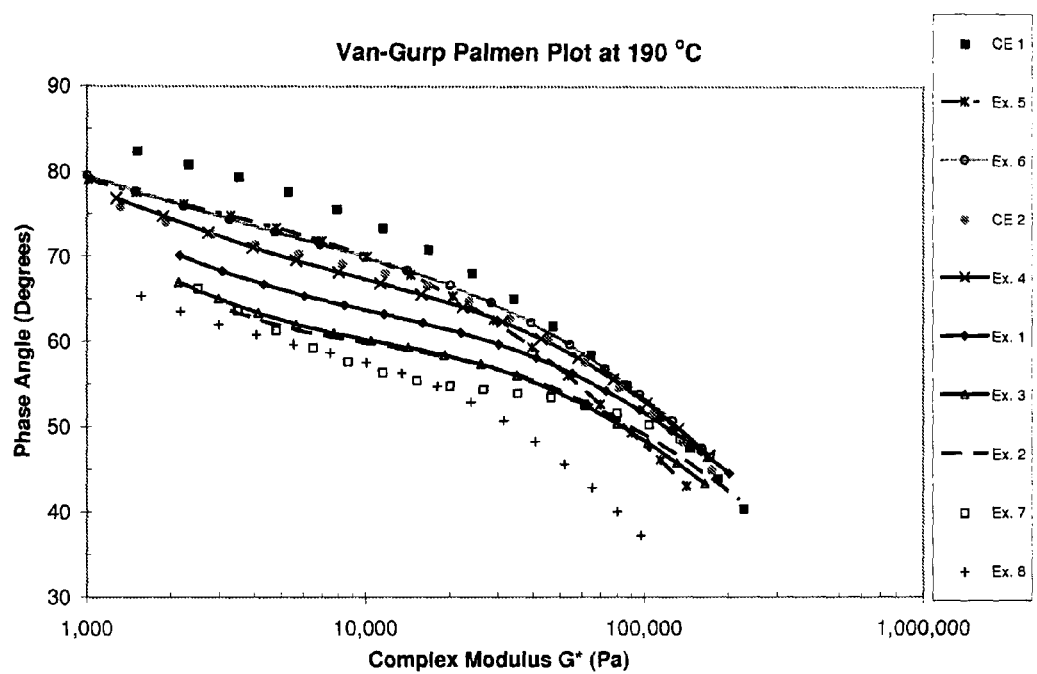
Figure 7: Dynamical mechanical spectroscopy data plot of phase angle vs. complex modulus (Van-Gurp Palmen plot) for Examples and Comparative Examples.

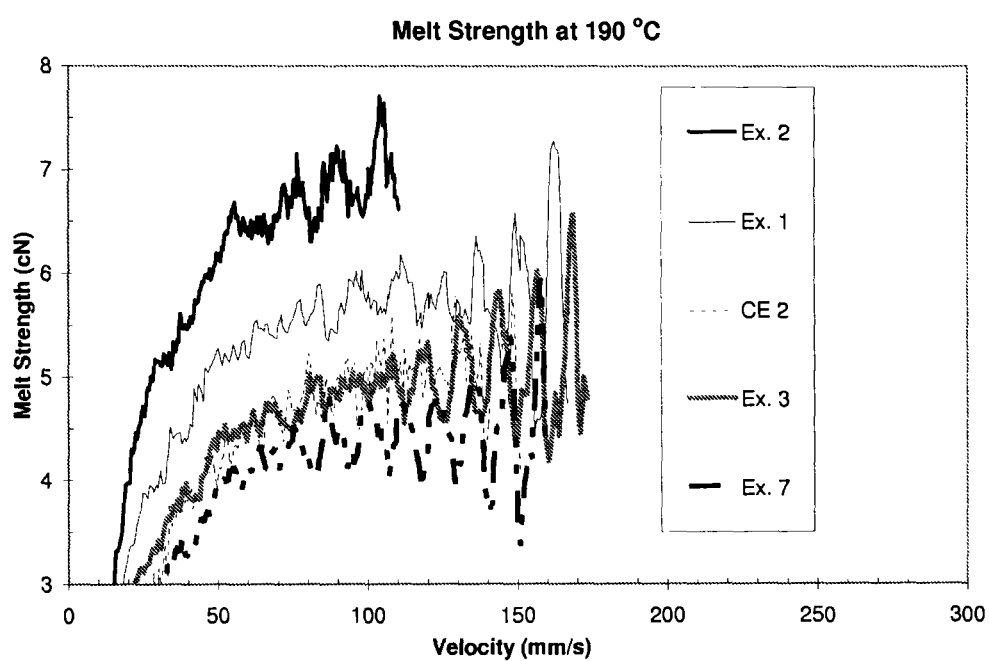
Figure 8: Melt strength data at 190 °C of 0.5 MI type samples: Examples 1, 2, 3, and 7 and Comparative Example 2.

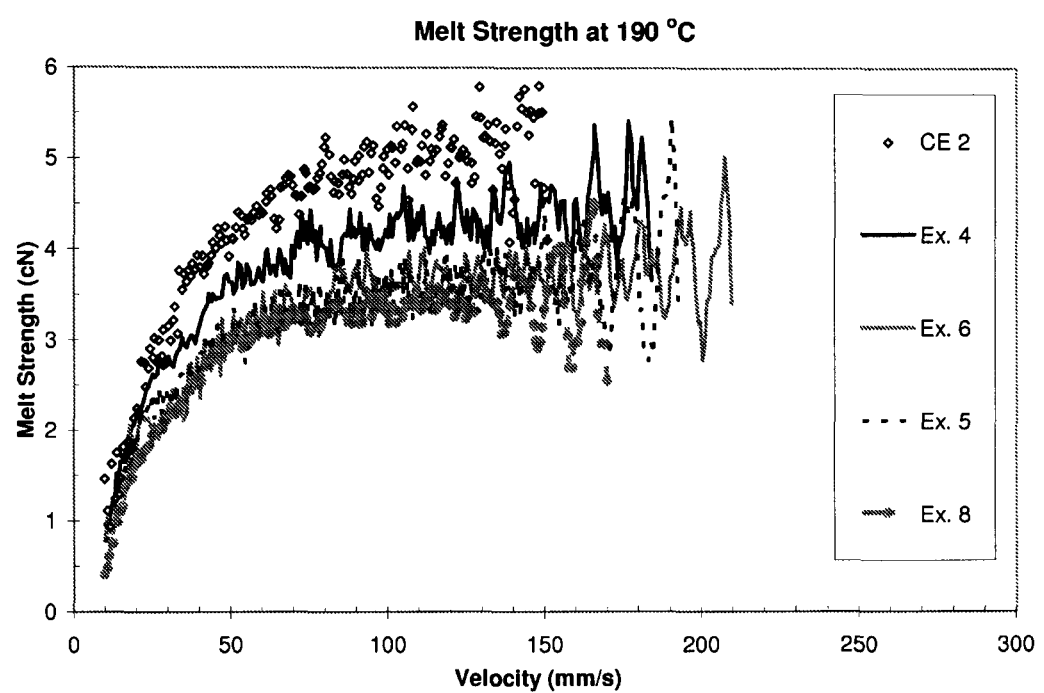
Figure 9: Melt strength data at 190 °C of 0.85 MI type samples: Examples 4, 5, 6, and 8 and Comparative Example 1.

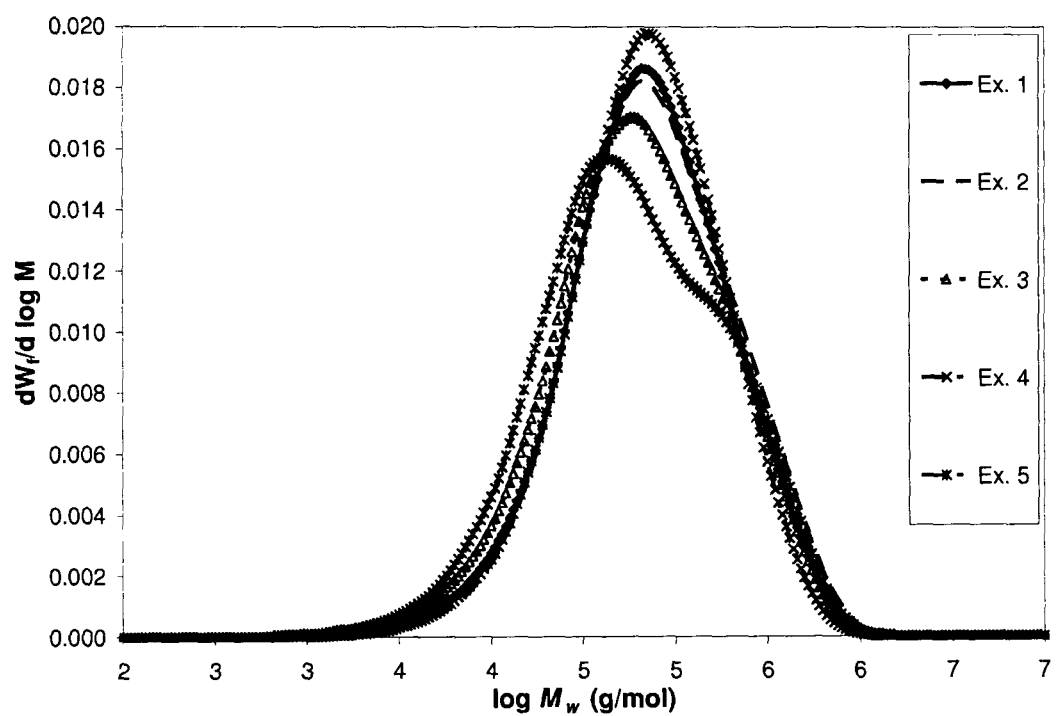
Figure 10. Conventional GPC plot for Examples 1 - 5.

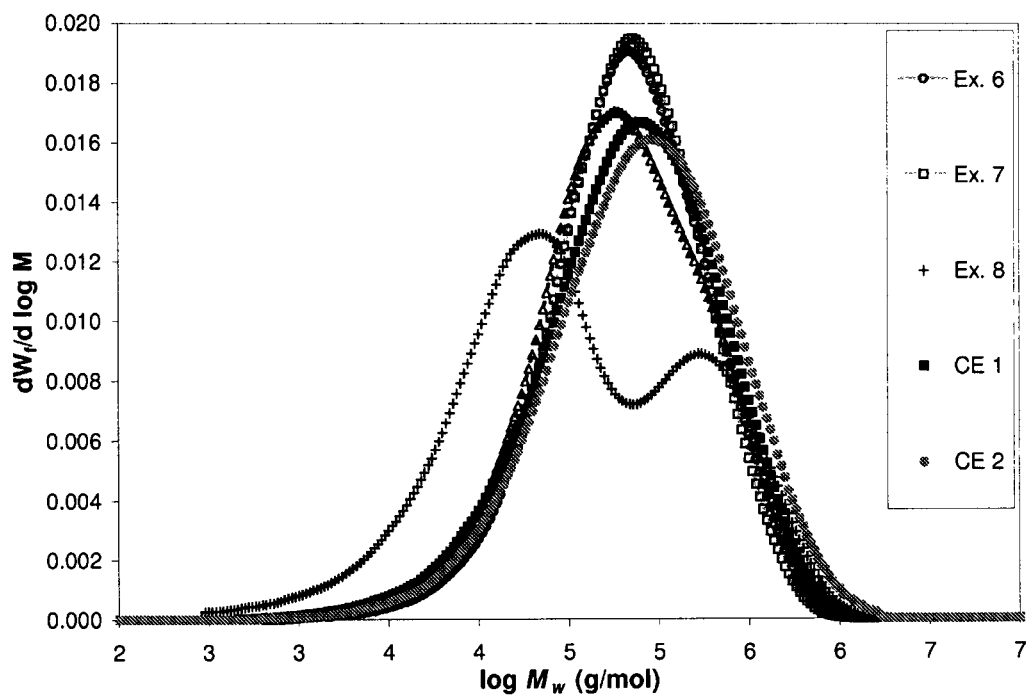
Figure 11. Conventional GPC plot for Examples 6 – 8 and Comparative Examples 1 - 2.

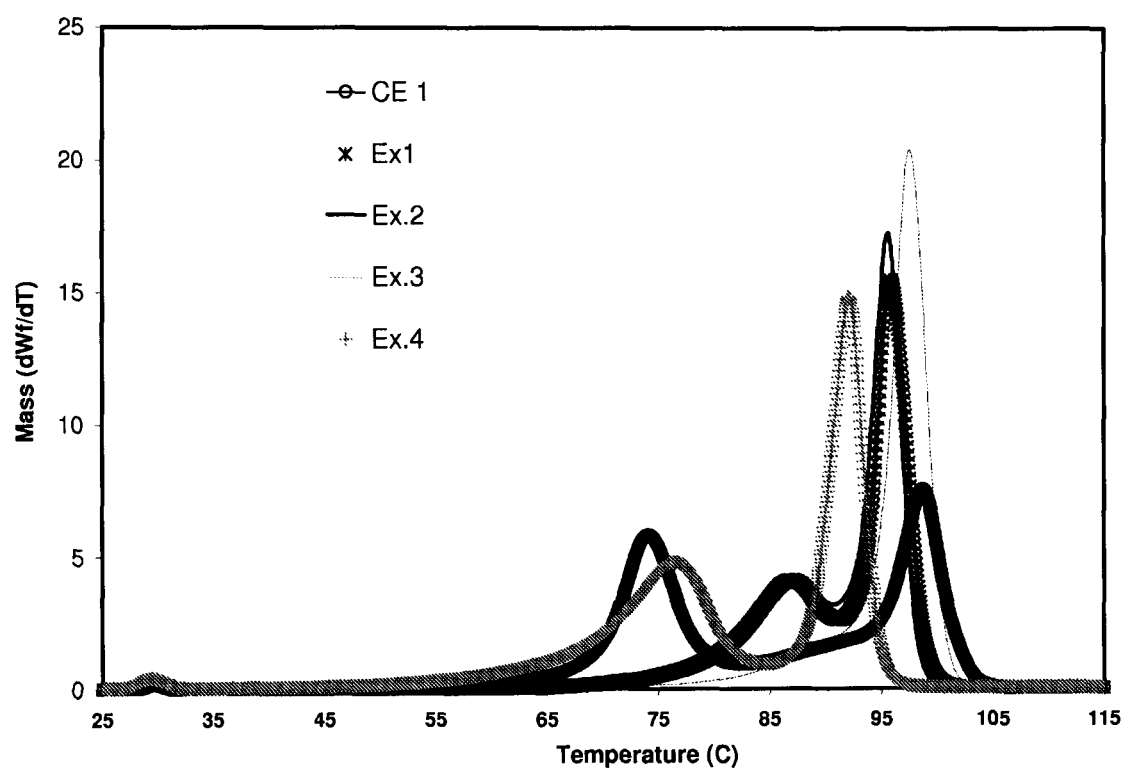
Figure 12. CEF plot for Examples 1 – 4 and Comparative Example 1.

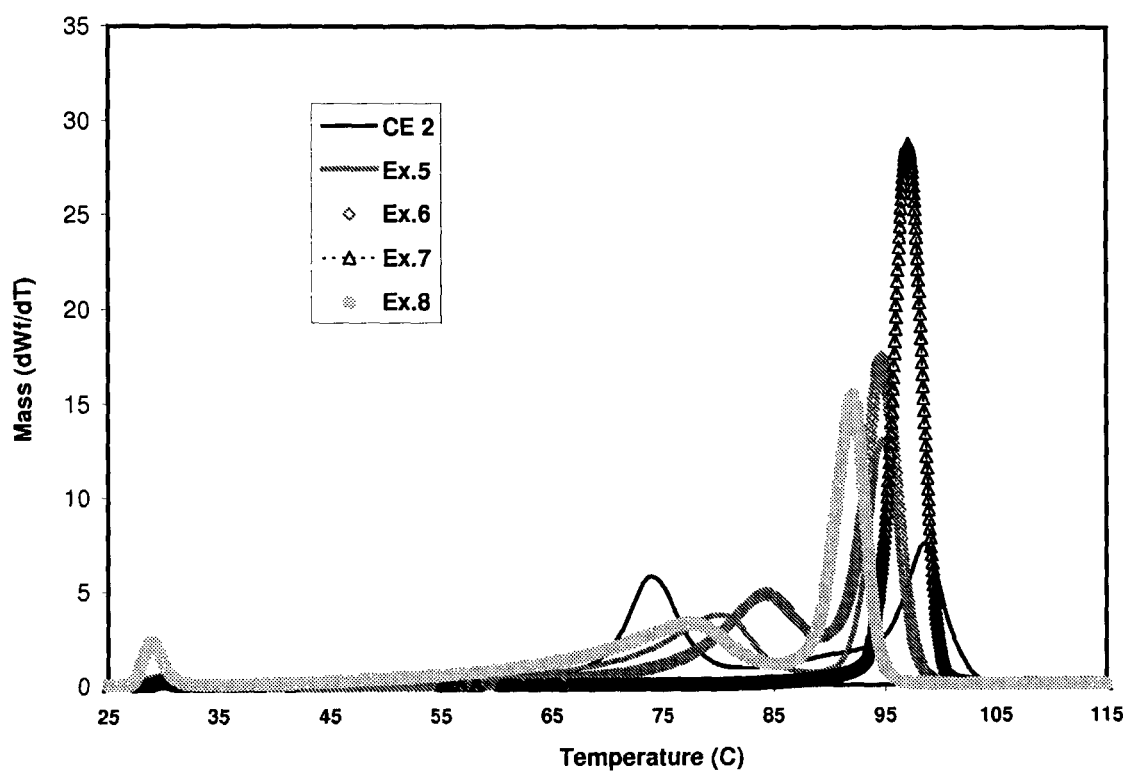
Figure 13. CEF plot for Examples 5 – 8 and Comparative Example 2.

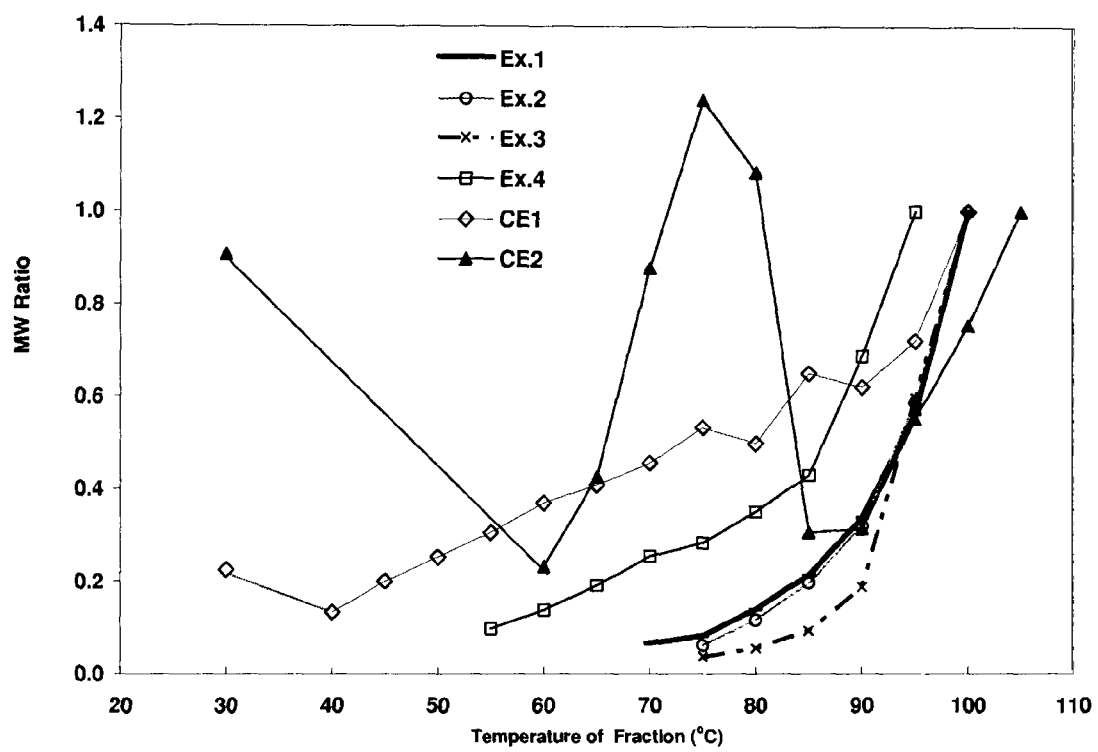
Figure 14. MW Ratio plot for Examples 1 – 4 and Comparative Examples 1 - 2.

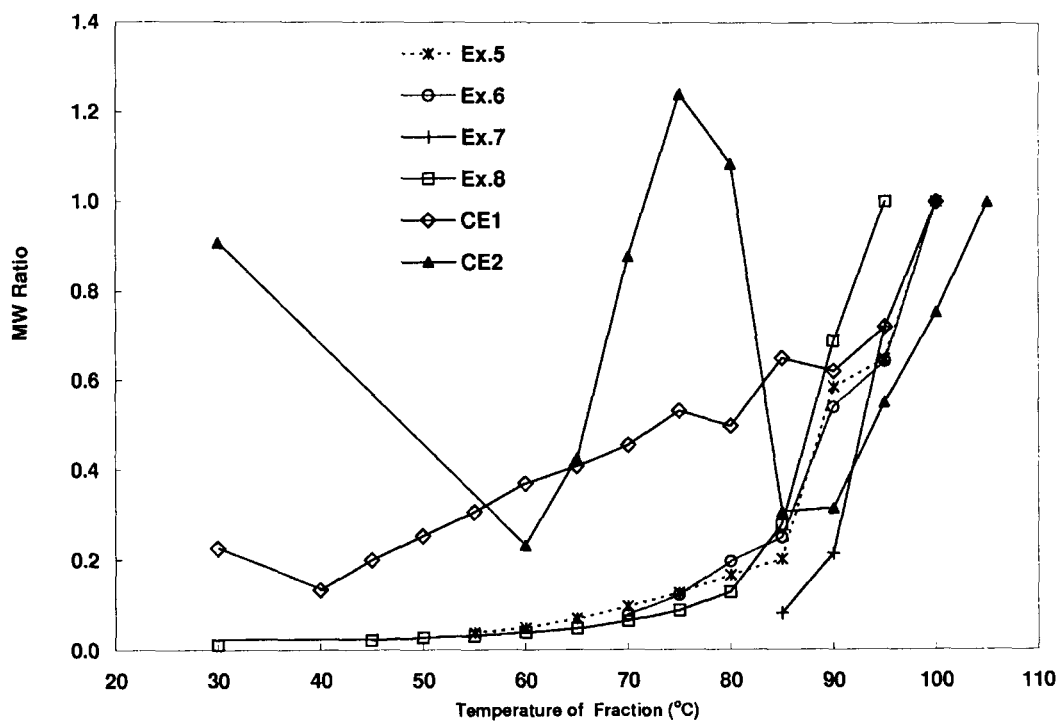
Figure 15. MW Ratio plot for Examples 5 – 8 and Comparative Examples 1 - 2.

ETHYLENE-BASED POLYMER COMPOSITIONS FOR USE AS A BLEND COMPONENT IN SHRINKAGE FILM APPLICATIONS

CROSS-REFERENCE TO RELATED APPLICATIONS

The present application is a continuation-in-part application of the U.S. application Ser. No. 12/814,902 filed on Jun. 14, 2010, now abandoned entitled "ETHYLENE-BASED POLYMER COMPOSITIONS FOR USE AS A BLEND COMPONENT IN SHRINKAGE FILM APPLICATIONS," the teachings of which are incorporated by reference herein, as if reproduced in full hereinbelow, which claims priority from the U.S. Provisional Application No. 61/222,371, filed on Jul. 1, 2009, entitled "ETHYLENE-BASED POLYMER COMPOSITIONS," the teachings of which are incorporated by reference herein, as if reproduced in full hereinbelow.

BACKGROUND OF THE INVENTION

There have been many varieties of polyethylene polymers polymerized over the years, including those made using high pressure free radical chemistry (LDPE), more traditional linear low density polyethylene (LLDPE) typically made using Ziegler-Natta catalysts or metallocene or constrained geometry catalysts. Some linear polyethylenes, but also some substantially linear polyethylenes, contain a slight amount of long chain branching. While these polymers have varying positives and negatives—depending on application or end-use—more control over the polymer structure is still desired.

We have now found that post-metallocene catalysts can efficiently polymerize ethylene into polymers and polymer compositions having controlled comonomer distribution profiles, while also controlling unsaturation levels in the polymer.

BRIEF SUMMARY OF THE INVENTION

The instant invention provides an ethylene-based polymer composition, and the method for producing the same, films made therefrom. In one embodiment, the invention is an ethylene-based polymer composition characterized by a Comonomer Distribution Constant (CDC) greater than about 45, more preferably greater than 50, most preferably greater than 95, and as high as 400, for example, as high as 350, or in the alternative, as high as 300, or in the alternative, as high as 250, or in the alternative, as high as 200, wherein the composition has less than 120 total unsaturation unit/1,000,000 C, for example, less than 110 total unsaturation unit/1,000,000, or in the alternative, less than 100 total unsaturation unit/1,000,000 C, or in the alternative, less than 80 total unsaturation unit/1,000,000 C, or in the alternative, less than 70 total unsaturation unit/1,000,000 C. Preferably, the composition has less than 15 trisubstituted unsaturation units/1,000,000 C, for example, less than 12 trisubstituted unsaturation units/1,000,000 C, or in the alternative, less than 10 trisubstituted unsaturation units/1,000,000 C, or in the alternative, less than 8 trisubstituted unsaturation units/1,000,000 C, or in the alternative, less than 5 trisubstituted unsaturation units/1,000,000 C. Preferably, the ethylene-based polymer compositions comprise up to about 3 long chain branches/1000 carbons, more preferably from about 0.01 to about 3 long chain branches/1000 carbons. The ethylene-based polymer composition can have a Zero Shear viscosity ratio (ZSVR) of at least 2 and/or less than 50. The inventive ethylene-based polymer compositions have a ZSVR in the range of at least 2, for example, at least 2.5, or in the alternative, at least 4, and/or less than 50, for example less than 30.

The ethylene-based polymer compositions can be further characterized by comprising less than 20 vinylidene unsaturation unit/1,000,000 C, for example, less than 18 vinylidene unsaturation unit/1,000,000 C, or in the alternative, less than 15 vinylidene unsaturation unit/1,000,000 C, or in the alternative, less than 12 vinylidene unsaturation unit/1,000,000 C, or in the alternative, less than 10 vinylidene unsaturation unit/1,000,000 C. The inventive ethylene-based polymer compositions can have a bimodal molecular weight distribution (MWD) or a multi-modal MWD. The inventive ethylene-based polymer compositions can also have a monomodal MWD. The inventive ethylene-based polymer compositions can have a comonomer distribution profile comprising a mono or bimodal distribution from 35° C. to 120° C., excluding the purge. The comonomer distribution profile is obtained by crystallization elution fractionation (CEF). The inventive ethylene-based polymer compositions can comprise a single DSC melting peak. The inventive ethylene-based polymer compositions can also comprise bimodal, or multiple melting peaks. The ethylene-based polymer compositions can comprise a weight average molecular weight ($M_w$) from 17,000 to 220,000 g/mol, for example, from 60,000 to 220,000 g/mol, from 70,000 to 140,000 g/mol. The compositions can also have a bimodal molecular weight distribution.

Preferably, the inventive ethylene-based polymer composition further comprises a melt index of less than or equal to 0.90 g/10 min and/or a density of less than 0.945 Wee and/or greater than 0.92 g/cc, preferably greater than 0.92 g/cc and/or less than 0.94 g/cc.

The cumulative weight fraction can be less than 0.10 for the fractions with a temperature up to 50° C., and preferably the cumulative weight fraction is not less than 0.03 for the fractions with a temperature up to 85° C.

The inventive ethylene-based polymer compositions can be further characterized as comprising:
 (a) one Component A being 20-65 wt % of the composition with a MI less than 0.3 and has a higher density than Component B with a density difference between Component B and A of greater than 0.005 Wee
 (b) Component B having a MI greater than that of Component A
 (c) With the overall polymer having a MI of less than or equal to 0.9 and a density of less than 0.945 Wee and greater than 0.92 g/cc.

The inventive ethylene-based polymer compositions can be further characterized by comprising less than 20 vinylidene unsaturation unit/1,000,000 C and/or by comprising less than 20 trisubstituted unsaturation unit/1,000,000 C.

The present invention further provides a thermoplastic composition comprising the above-described inventive ethylene-based polymer composition and optionally one or more polymers.

The present invention further provides a film comprising (1) at least one layer comprising a thermoplastic composition comprising (a) the inventive ethylene-based polymer composition and (b) optionally one or more polymers; and (2) optionally one or more layers.

The present invention further provides a multilayer structure comprising a film comprising (1) at least one layer comprising a thermoplastic composition comprising (a) the inventive ethylene-based polymer composition and (b) optionally one or more polymers; and (2) optionally one or more layers.

The present invention further provides a storage device comprising a film, for example a shrink film, comprising (1)

at least one layer comprising a thermoplastic composition comprising (a) the inventive ethylene-based polymer composition and (b) optionally one or more polymers; and (2) optionally one or more layers.

Fabricated articles comprising the novel polymer compositions are also contemplated, especially in the form of at least one film layer. Other embodiments include thermoplastic formulations comprising the novel inventive ethylene-based polymer composition and at least one natural or synthetic polymer.

Fabricated articles comprising the inventive ethylene-based polymer compositions are also contemplated, especially at least one film layer, as are thermoplastic formulations comprising the compositions and at least one natural or synthetic polymer, especially wherein the synthetic polymer is LDPE and the % LDPE is greater than 30% in which in which a blown film comprising the formulation has a MD shrink tension is greater than 15 cN, puncture is greater than 60 ft-lb/in$^3$, and/or haze is less than 20%.

The inventive ethylene-based polymer compositions can be at least partially cross-linked (at least 5 wt % gel).

The inventive ethylene-based polymer compositions can be characterized as having a ratio of viscosity at 190° C. at 0.1 rad/s to a viscosity at 190° C. at 100 rads of greater than 8.5 as determined by dynamic mechanical spectroscopy and/or characterized as having a phase angle of less than 65 degrees and greater than 0 degrees at a complex modulus of 10,000 Pa as determined by dynamic mechanical spectroscopy at 190° C. The inventive ethylene-based polymer compositions can also be characterized as having a $M_w/M_n$ of less than 10 and preferably less than 4, but greater than 2.

In another embodiment, the present invention is a process comprising:

(A) polymerizing ethylene and optionally one or more α-olefins in the presence of a first catalyst to form a semi-crystalline ethylene-based polymer in a first reactor or a first part of a multi-part reactor; and (B) reacting freshly supplied ethylene and optionally one or more α-olefins in the presence of a second catalyst comprising an organometallic catalyst thereby forming an ethylene-based polymer composition in at least one other reactor or a later part of a multi-part reactor, wherein the catalyst of (A) and (B) can be the same or different and each is a metal complex of a polyvalent aryloxyether corresponding to the formula:

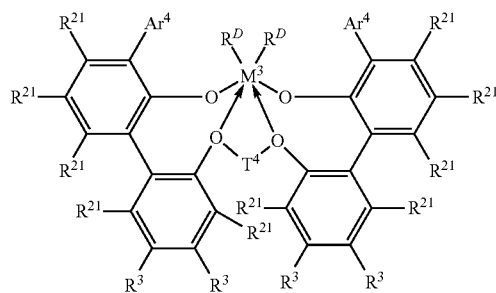

where $M^3$ is Ti, Hf or Zr, preferably Zr;

$Ar^4$ independently each occurrence is a substituted $C_{9-20}$ aryl group, wherein the substituents, independently each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group, especially where the reaction of step (B) occurs by graft polymerization.

In yet another embodiment, the present invention is a method of characterizing an ethylene based polymer for comonomer composition distribution (CDC), wherein CDC is calculated from comonomer distribution profile by CEF, and CDC is defined as Comonomer Distribution Index divided by Comonomer Distribution Shape Factor multiplying by 100 as shown in Equation 1, and wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature (Tp), and wherein the method comprises the following steps In yet another embodiment, the present invention is a method of characterizing an ethylene based polymer for comonomer composition distribution (CDC), wherein CDC is calculated from comonomer distribution profile by CEF, and CDC is defined as Comonomer Distribution Index divided by Comonomer Distribution Shape Factor multiplying by 100 as shown in Equation 1, and wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature (Tp), and wherein the method comprises the following steps:

(A) Obtain a weight fraction at each temperature (T) ($w_T$ (T)) from 35.0° C. to 119.0° C. with a temperature step increase of 0.200° C. from CEF according to Equation 2;

(B) Calculate the median temperature ($T_{median}$) at cumulative weight fraction of 0.500, according to Equation 3;

(C) Calculate the corresponding median comonomer content in mole % ($C_{median}$) at the median temperature ($T_{median}$) by using comonomer content calibration curve according to Equation 4;

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average Mw of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; The calibration is calculated from each reference material as shown in Formula 4, wherein: $R^2$ is the correlation constant;

(F) Calculate Comonomer Distribution Index from the total weight fraction with a comonomer content ranging from $0.5*C_{median}$ to $1.5*C_{median}$, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak;

(H) Calculate the standard deviation of temperature (Stdev) according Equation 5.

In an alternative embodiment, the instant invention provides an ethylene-based polymer composition, method of producing the same, articles/films/multilayer structures/storage devices made therefrom, and method of making the same, in accordance with any of the preceding embodiments, except that ethylene-based polymer composition has a density in the range of 0.900 to 0.965 g/cm³; for example, 0.905 to 0.940 g/cm³.

In an alternative embodiment, the instant invention provides an ethylene-based polymer composition, method of producing the same, articles/films/multilayer structures/storage devices made therefrom, and method of making the same, in accordance with any of the preceding embodiments, except that ethylene-based polymer composition has melt index ($I_2$) of 0.1 to 1000 g/10 minutes; for example, 0.1 to 5.

In an alternative embodiment, the instant invention provides an ethylene-based polymer composition, method of producing the same, articles/films/multilayer structures/storage devices made therefrom, and method of making the same, in accordance with any of the preceding embodiments, except that ethylene-based polymer composition has $I_{10}/I_2$ of less than 20, for example, in the range of from 6 to 20.

In an alternative embodiment, the instant invention provides articles/films/multilayer structures/storage devices made therefrom, and method of making the same, in accordance with any of the preceding embodiments, except that the film has a thickness in the range of from 0.5 to 5 mil.

In an alternative embodiment, the instant invention provides articles/films/multilayer structures/storage devices made therefrom, and method of making the same, in accordance with any of the preceding embodiments, except that film has a MD shrink tension of greater than 15 cN, puncture strength of greater than 75 ft-lb/in³, and/or a haze of less than 20%.

BRIEF DESCRIPTION OF THE DRAWINGS

For the purpose of illustrating the invention, there is shown in the drawings a form that is exemplary; it being understood, however, that this invention is not limited to the precise arrangements and illustrations shown.

FIG. 2 illustrates the modified pulse sequences for unsaturation with Bruker AVANCE 400 MHz spectrometer; FIG. 4 is a graph illustrating Comonomer distribution profile for Example 1; and FIG. 5 Dynamical mechanical spectroscopy complex viscosity data versus frequency for Examples and Comparative Examples; and FIG. 6 is a graph illustrating Dynamical mechanical spectroscopy tan delta data versus frequency for Examples and Comparative Examples; and FIG. 7 is a graph illustrating Dynamical mechanical spectroscopy data plot of phase angle vs. complex modulus (Van-Gurp Palmen plot) for Examples and Comparative Examples; and FIG. 8 is a graph illustrating Melt strength data at 190° C. of 0.5 MI type samples: Examples 1, 2, 3, and 7 and Comparative Example 2; and FIG. 9 is a graph illustrating Melt strength data at 190° C. of 0.85 MI type samples: Examples 4, 5, 6, and 8 and Comparative Example 1; and FIG. 10 is a graph illustrating Conventional GPC plot for Examples 1-5; and FIG. 11 is a graph illustrating Conventional GPC plot for Examples 6-8 and Comparative Examples 1-2; and FIG. 12 illustrates the CEF plot for Examples 1-4 and Comparative Example 1; and FIG. 13 illustrates the CEF plot for Examples 5-8 and Comparative Example 2.

FIG. 14 illustrates the MW Ratio plot for Examples 1-4 and Comparative Examples 1-2; and FIG. 15 illustrates the MW Ratio plot for Examples 5-8 and Comparative Examples 1-2.

DETAILED DESCRIPTION OF THE INVENTION

Figure 1:
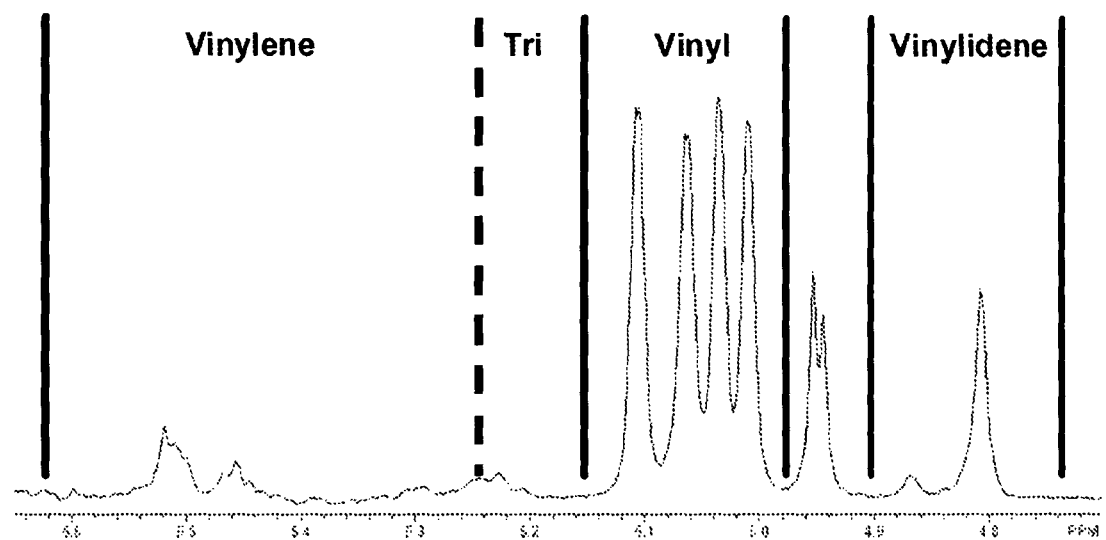
FIG. 1 is a graph illustrating integration limits for unsaturation of an Inventive Example, the dash line means the position can be slightly different depends on the sample/catalyst.
Figure 3:
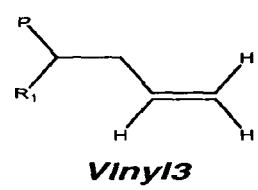
FIG. 3 illustrates chemical structure representations of unsaturations.

The instant invention provides an ethylene-based polymer composition, and the method for producing the same, films made therefrom. In one embodiment, the invention is an ethylene-based polymer composition characterized by a Comonomer Distribution Constant (CDC) greater than about 45, more preferably greater than 50, most preferably greater than 95, and as high as 400, for example, as high as 350, or in the alternative, as high as 300, or in the alternative, as high as 250, or in the alternative, as high as 200, wherein the composition has less than 120 total unsaturation unit/1,000,000 C, for example, less than 110 total unsaturation unit/1,000,000, or in the alternative, less than 100 total unsaturation unit/1,000,000 C, or in the alternative, less than 80 total unsaturation unit/1,000,000 C, or in the alternative, less than 70 total unsaturation unit/1,000,000 C. Preferably, the composition has less than 15 trisubstituted unsaturation units/1,000,000 C, for example, less than 12 trisubstituted unsaturation units/1,000,000 C, or in the alternative, less than 10 trisubstituted unsaturation units/1,000,000 C, or in the alternative, less than 8 trisubstituted unsaturation units/1,000,000 C, or in the alternative, less than 5 trisubstituted unsaturation units/1,000,000 C. Preferably, the ethylene-based polymer compositions comprise up to about 3 long chain branches/1000 carbons, more preferably from about 0.01 to about 3 long chain branches/1000 carbons. The ethylene-based polymer composition can have a Zero Shear viscosity ratio (ZSVR) of at least 2 and/or less than 50. The inventive ethylene-based polymer compositions have a ZSVR in the range of at least 2, for example, at least 2.5, or in the alternative, for example, at least 4, and/or less than 50, for example less than 30.

The ethylene-based polymer compositions can be further characterized by comprising less than 20 vinylidene unsaturation unit/1,000,000 C, for example, less than 18 vinylidene unsaturation unit/1,000,000 C, or in the alternative, less than 15 vinylidene unsaturation unit/1,000,000 C, or in the alternative, less than 12 vinylidene unsaturation unit/1,000,000 C, or in the alternative, less than 10 vinylidene unsaturation unit/1,000,000 C. The inventive ethylene-based polymer compositions can have a bimodal molecular weight distribution (MWD) or a multi-modal MWD. The inventive ethylene-based polymer compositions can also have a monomodal MWD. The inventive ethylene-based polymer compositions can have a comonomer distribution profile comprising a mono or bimodal distribution from 35° C. to 120° C., excluding the purge. The comonomer distribution profile is obtained by crystallization elution fractionation (CEF). The inventive ethylene-based polymer compositions can comprise a single DSC melting peak. The inventive ethylene-based polymer compositions can also comprise bimodal, or multiple melting peaks. The ethylene-based polymer compositions can comprise a weight average molecular weight ($M_w$) from 17,000 to 220,000 g/mol, for example, from 60,000 to 220,000 g/mol, from 70,000 to 140,000 g/mol. The compositions can also have a bimodal molecular weight distribution.

Preferably, the inventive ethylene-based polymer composition further comprises a melt index of less than or equal to 0.90 g/10 min and/or a density of less than 0.945 g/cc and/or greater than 0.92 g/cc, preferably greater than 0.92 g/cc and less than 0.94 g/cc.

The cumulative weight fraction can be less than 0.10 for the fractions with a temperature up to 50° C. and preferably the cumulative weight fraction is not less than 0.03 for the fractions with a temperature up to 85° C.

The inventive ethylene-based polymer compositions can be further characterized as comprising:
(a) one Component A being 20-65 wt % of the composition with a MI less than 0.3 and has a higher density than Component B with a density difference between Component B and A of greater than 0.005 g/cc;
(b) Component B having a MI greater than that of Component A
(c) With the overall polymer having a MI of less than or equal to 0.9 and a density of less than 0.945 g/cc and greater than 0.92 g/cc.

The inventive ethylene-based polymer compositions can be further characterized by comprising less than 20 vinylidene unsaturation unit/1,000,000 C and/or by comprising less than 20 trisubstituted unsaturation unit/1,000,000 C.

The present invention further provides a thermoplastic composition comprising the above-described inventive ethylene-based polymer composition and optionally one or more polymers.

The present invention further provides a film comprising (1) at least one layer comprising a thermoplastic composition comprising (a) the inventive ethylene-based polymer composition and (b) optionally one or more polymers; and (2) optionally one or more layers.

The present invention further provides a multilayer structure comprising a film comprising (1) at least one layer comprising a thermoplastic composition comprising (a) the inventive ethylene-based polymer composition and (b) optionally one or more polymers; and (2) optionally one or more layers.

The present invention further provides a storage device comprising a film, for example a shrink film, comprising (1) at least one layer comprising a thermoplastic composition comprising (a) the inventive ethylene-based polymer composition and (b) optionally one or more polymers; and (2) optionally one or more layers.

Fabricated articles comprising the novel polymer compositions are also contemplated, especially in the form of at least one film layer. Other embodiments include thermoplastic formulations comprising the novel polymer composition and at least one natural or synthetic polymer.

Fabricated articles comprising the inventive ethylene-based polymer compositions are also contemplated, especially at least one film layer, as are thermoplastic formulations comprising the compositions and at least one natural or synthetic polymer, especially wherein the synthetic polymer is LDPE and the % LDPE is greater than 30% in which in which a blown film comprising the formulation has a MD shrink tension is greater than 15 cN, puncture is greater than 60 ft-lb/in³, and/or haze is less than 20%.

The inventive ethylene-based polymer compositions can be at least partially cross-linked (at least 5 wt % gel).

The inventive ethylene-based polymer compositions can be characterized as having a ratio of viscosity at 190° C. at 0.1 rad/s to a viscosity at 190° C. at 100 rad/s of greater than 8.5 as determined by dynamic mechanical spectroscopy and/or characterized as having a phase angle of less than 65 degrees and greater than 0 degrees at a complex modulus of 10,000 Pa as determined by dynamic mechanical spectroscopy at 190° C. The inventive ethylene-based polymer compositions can also be characterized as having a $M_w/M_n$ less than 10 and preferably less than 4, but greater than 2.

In another embodiment, the present invention is a process comprising:
(A) polymerizing ethylene and optionally one or more α-olefins in the presence of a first catalyst to form a semi-crystalline ethylene-based polymer in a first reactor or a first part of a multi-part reactor; and
(B) reacting freshly supplied ethylene and optionally one or more α-olefins in the presence of a second catalyst comprising an organometallic catalyst thereby forming an ethylene-based polymer composition in at least one other reactor or a later part of a multi-part reactor, wherein the catalyst of (A) and (B) can be the same or different and each is a metal complex of a polyvalent aryloxyether corresponding to the formula:

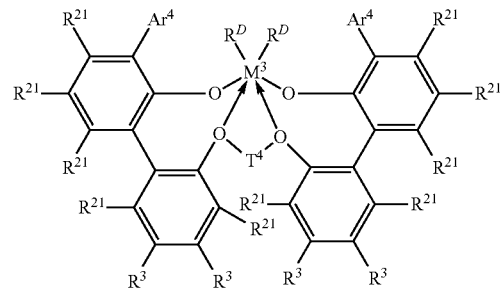

where $M^3$ is Ti, Hf or Zr, preferably Zr;

$Ar^4$ independently each occurrence is a substituted $C_{9-20}$ aryl group, wherein the substituents, independently each occurrence, are selected from the group consisting of alkyl;

cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group, especially where the reaction of step (B) occurs by graft polymerization.

In yet another embodiment, the present invention is a method of characterizing an ethylene based polymer for comonomer composition distribution (CDC), wherein CDC is calculated from comonomer distribution profile by CEF, and CDC is defined as Comonomer Distribution Index divided by Comonomer Distribution Shape Factor multiplying by 100 as shown in Equation 1, and wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature (Tp), and wherein the method comprises the following steps:

(A) Obtain a weight fraction at each temperature (T) ($w_T$(T)) from 35.0° C. to 119.0° C. with a temperature step increase of 0.200° C. from CEF according to Equation 2;

(B) Calculate the median temperature ($T_{median}$) at cumulative weight fraction of than, 0.500, according to Equation 3;

(C) Calculate the corresponding median comonomer content in mole % ($C_{median}$) at the median temperature ($T_{median}$)) by using comonomer content calibration curve according to Equation 4;

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average Mw of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; The calibration is calculated from each reference material as shown in Formula, wherein: $R^2$ is the correlation constant;

(F) Calculate Comonomer Distribution Index from the total weight fraction with a comonomer content ranging from $0.5*C_{median}$ to $1.5*C_{median}$, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak;

(H) Calculate the standard deviation of temperature (Stdev) according Equation 5.

In an alternative embodiment, the instant invention provides an ethylene-based polymer composition, method of producing the same, articles/films/multilayer structures/storage devices made therefrom, and method of making the same, in accordance with any of the preceding embodiments, except that ethylene-based polymer composition has a density in the range of 0.900 to 0.965 g/cm³; for example, 0.905 to 0.940 g/cm³.

In an alternative embodiment, the instant invention provides an ethylene-based polymer composition, method of producing the same, articles/films/multilayer structures/storage devices made therefrom, and method of making the same, in accordance with any of the preceding embodiments, except that ethylene-based polymer composition has melt index ($I_2$) in the range of from 0.1 to 1000 g/10 minutes; for example, 0.1 to 5.

In an alternative embodiment, the instant invention provides an ethylene-based polymer composition, method of producing the same, articles/films/multilayer structures/storage devices made therefrom, and method of making the same, in accordance with any of the preceding embodiments, except that ethylene-based polymer composition has $I_{10}/I_2$ of less than 20, for example, in the range of from 6 to 20.

In an alternative embodiment, the instant invention provides articles/films/multilayer structures/storage devices made therefrom, and method of making the same, in accordance with any of the preceding embodiments, except that film has a thickness in the range of from 0.5 to 5 mil.

In some processes, processing aids, such as plasticizers, can also be included in the inventive ethylene-based polymer product. These aids include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as KAYDOL oil (Chemtura Corp.; Middlebury, Conn.) and SHELL-FLEX 371 naphthenic oil (Shell Lubricants; Houston, Tex.). Another suitable oil is TUFFLO oil (Lyondell Lubricants; Houston, Tex.).

In some processes, inventive ethylene-based polymer compositions are treated with one or more stabilizers, for example, antioxidants, such as IRGANOX 1010 and IRGAFOS 168 (Ciba Specialty Chemicals; Glattbrugg, Switzerland). In general, polymers are treated with one or more stabilizers before an extrusion or other melt processes. In other embodiment processes, other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. The inventive ethylene-based polymer compositions may, for example, comprise less than 10 percent by the combined weight of one or more additives, based on the weight of the inventive ethylene-based polymer compositions. A particular benefit of the claimed polymers is the absence of catalyst kill agents, other than water, thus eliminating the need for calcium stearate.

The inventive ethylene-based polymer composition produced may further be compounded. In some embodiments, one or more antioxidants may further be compounded into the inventive ethylene-based polymer compositions and the compounded polymer pelletized. The compounded inventive ethylene-based polymer compositions may contain any amount of one or more antioxidants. For example, the compounded inventive ethylene-based polymer compositions may comprise from about 200 to about 600 parts of one or more phenolic antioxidants per one million parts of the inventive ethylene-based polymer compositions. In addition, the compounded inventive ethylene-based polymer compositions may comprise from about 800 to about 1200 parts of a phosphite-based antioxidant per one million parts of inventive ethylene-based polymer compositions. The compounded inventive ethylene-based polymer compositions may further comprise from about 300 to about 1250 parts of calcium stearate per one million parts of inventive ethylene-based polymer compositions.

Uses

The inventive ethylene-based polymer compositions may be employed in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics. Thermoplastic compositions comprising the inventive ethylene-based polymer compositions include blends with other natural or synthetic materials, polymers, additives, reinforcing agents, ignition resistant additives, antioxidants, stabilizers, colorants, extenders, crosslinkers, blowing agents, and plasticizers.

The inventive ethylene-based polymer compositions may be used in producing fibers for other applications. Fibers that may be prepared from the inventive ethylene-based polymer compositions or blends thereof include staple fibers, tow, multicomponent, sheath/core, twisted, and monofilament. Suitable fiber forming processes include spunbonded and melt blown techniques, as disclosed in U.S. Pat. Nos. 4,340, 563 (Appel, et al.), 4,663,220 (Wisneski, et al.), 4,668,566 (Nohr, et al.), and 4,322,027 (Reba), gel spun fibers as disclosed in U.S. Pat. No. 4,413,110 (Kavesh, et al.), woven and nonwoven fabrics, as disclosed in U.S. Pat. No. 3,485,706 (May), or structures made from such fibers, including blends with other fibers, such as polyester, nylon or cotton, thermoformed articles, extruded shapes, including profile extrusions and co-extrusions, calendared articles, and drawn, twisted, or crimped yarns or fibers.

Additives and adjuvants may be added to the inventive ethylene-based polymer compositions post-formation. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers that are or can be made according to the embodiment methods.

Blends and mixtures of the inventive ethylene-based polymer compositions with other polyolefins may be performed. Suitable polymers for blending with the inventive ethylene-based polymer compositions include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical low density polyethylene (LDPE), Ziegler-Natta linear low density polyethylene (LLDPE), metallocene PE, including multiple reactor PE ("in reactor" blends of Ziegler-Natta PE and metallocene PE, such as products disclosed in U.S. Pat. Nos. 6,545,088 (Kolthammer, et al.); 6,538,070 (Cardwell, et al.); 6,566,446 (Parikh, et al.); 5,844,045 (Kolthammer, et al.); 5,869,575 (Kolthammer, et al.); and 6,448,341 (Kolthammer, et al.)), ethylene-vinyl acetate (EVA), ethylene/vinyl alcohol copolymers, polystyrene, impact modified polystyrene, Acrylonitrile-Butadiene-Styrene (ABS), styrene/butadiene block copolymers and hydrogenated derivatives thereof (Styrene-Butadiene-Styrene (SBS) and Styrene-Ethylene-Butadiene-Styrene (SEBS), and thermoplastic polyurethanes. Homogeneous polymers such as olefin plastomers and elastomers, ethylene and propylene-based copolymers (for example, polymers available under the trade designation VERSIFY™ Plastomers & Elastomers (The Dow Chemical Company), SURPASS (Nova Chemicals), and VISTAMAXX™ (ExxonMobil Chemical Co.)) can also be useful as components in blends comprising the inventive ethylene-based polymer.

The inventive ethylene-based polymer compositions maybe employed as sealant resins. Surprisingly, certain short chain branching distribution (SCBD), as shown by Comonomer Distribution Constant (CDC), in combination with certain molecular weight distribution (MWD), and a certain level of long chain branching (LCB) has shown to improve hot tack and heat seal performance, including increased hot-tack & heat-seal strength, lower heat seal and hot tack initiation temperatures, and a broadening of the hot tack window. The inventive ethylene-based polymer compositions may be employed as a pipe and tubing resin through an optimization of the SCBD and MWD, with low unsaturation levels for improved ESCR (environmental stress crack resistance) and higher PENT (Pennsylvania Edge-Notch Tensile Test). The inventive ethylene-based polymer compositions may be employed in applications where ultraviolet (UV) stability, and weatherability are desired through an optimization of the SCBD and MWD, in combination with low unsaturation levels, and low levels of low molecular weight, high comonomer incorporated oligomers. The inventive ethylene-based polymer compositions may be employed in applications where low levels of plate-out, blooming, die build-up, smoke formation, extractables, taste, and odor are desired through an optimization of the SCBD and MWD with low levels of low molecular weight, high comonomer incorporated oligomers. The inventive ethylene-based polymer compositions may be employed in stretch film applications. Surprisingly, certain SCBD, in combination with certain MWD, and a certain level of long chain branching (LCB) shows improved stretchability and dynamic puncture resistance.

DEFINITIONS

The term "composition," as used, includes a mixture of materials which comprise the composition, as well as reaction products and decomposition products formed from the materials of the composition.

The terms "blend" or "polymer blend," as used herein, refers to an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be affected by physically mixing the two or more polymers on the macro level (for example, melt blending resins or compounding) or the micro level (for example, simultaneous forming within the same reactor).

The term "linear" as used herein refers to polymers where the polymer backbone of the polymer lacks measurable or demonstrable long chain branches, for example, the polymer can be substituted with an average of less than 0.01 long branch per 1000 carbons.

The term "polymer" as used herein refers to a polymeric compound prepared by polymerizing monomers, whether of the same or a different type. The generic term polymer thus embraces the term "homopolymer," usually employed to refer to polymers prepared from only one type of monomer, and the term "interpolymer" as defined below. The terms "ethylene/α-olefin polymer" is indicative of interpolymers as described.

The term "interpolymer" as used herein, refers to polymers prepared by the polymerization of at least two different types of monomers. The generic term interpolymer includes copolymers, usually employed to refer to polymers prepared from two different monomers, and polymers prepared from more than two different types of monomers.

The term "ethylene-based polymer" refers to a polymer that contains more than 50 mole percent polymerized ethylene monomer (based on the total amount of polymerizable monomers) and, optionally, may contain at least one comonomer.

The term "ethylene/α-olefin interpolymer" refers to an interpolymer that contains more than 50 mole percent polymerized ethylene monomer (based on the total amount of polymerizable monomers) and at least one α-olefin.

Equation 1 means:

$$CDC = \frac{\text{Comonomer Distribution Index}}{\text{Comonomer Distribution Shape Factor}} = \frac{\text{Comonomer Distribution Index}}{\text{Half Width}/Stdev} * 100$$

Equation 2 means:

$$\int_{35}^{1190} w_T(T)\,dT = 1$$

Equation 3 means:

$$\int_{35}^{T_{median}} w_T(T)\,dT = 0.5$$

Equation 4 means:

$$\ln(1 - comonomercontent) = -\frac{207.26}{273.12 + T} + 0.5533$$

$R^2 = 0.997$

Equation 5 means:

$$Stdev = \sqrt{\sum_{350}^{1190}(T - T_p)^2 * w_T(T)}$$

Equation 6 means:

% Crystallinity = $((H_f)/(292 \text{ J/g})) \times 100$

Equation 7 means:

$$\text{Resolution} = \frac{\text{Peak temperature of NIST 1475a} - \text{Peak Temperature of Hexacontane}}{\text{Half-height Width of NIST 1475a} + \text{Half-height Width of Hexacontane}}$$

Equation 8 means:

$$ZSVR = \frac{\eta_{0B}}{\eta_{0L}} = \frac{\eta_{0B}}{2.29 \times 10^{-15} M_{w-gpc}^{3.65}}$$

Equation 12 means:

$M_{polystyrene} = A(M_{polystyrene})^E$

Equation 13 means:

$$M_w(cc) = \frac{\sum_i RI_i * M_{cc,i}}{\sum_i RI_i}$$

Equation 14 means:

Plate Count = $5.54 * [RV_{pkmax} / (RV_{Rear50\%pkht} - RV_{Front50\%pkht})]^2$ Equation 15 means:

$$\frac{(\text{Initial Length}) - (\text{Final Length})}{\text{Initial Length}} \times 100$$

Resin Production

All raw materials (ethylene, 1-octene) and the process solvent (a narrow boiling range high-purity isoparaffinic solvent commercially available under the tradename Isopar E from Exxon Mobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to above reaction pressure of approximately from 700 to 750 psig. The solvent and comonomer (1-octene) feed is pressurized via mechanical positive displacement pump to above reaction pressure of approximately from 700 to 750 psig. The individual catalyst components are manually batch diluted to specified component concentrations with purified solvent (Isopar E) and pressurized to a pressure that is above the reaction pressure, approximately from 700 to 750 psig. All reaction feed flows are measured with mass flow meters and independently controlled with computer automated valve control systems.

The continuous solution polymerization reactor system according to the present invention consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 5° C. to 50° C. and typically between 15-40° C. by passing the feed stream through a series of heat exchangers. The fresh comonomer feed to the polymerization reactors can be manually aligned to add comonomer to one of three choices: the first reactor, the second reactor, or the common solvent and then split between both reactors proportionate to the solvent feed split. The total fresh feed to each polymerization reactor is injected into the reactor at two locations per reactor roughly with equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with Kenics static mixing elements. The contents of each reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. The effluent from the first polymerization reactor (containing solvent, monomer, comonomer, hydrogen, catalyst components, and molten polymer) exits the first reactor loop and passes through a control valve (responsible for maintaining the pressure of the first reactor at a specified target) and is injected into the second polymerization reactor of similar design. As the stream exits the reactor it is contacted with water to stop the reaction. In addition, various additives such as anti-oxidants, can be added at this point. The stream then goes through another set of Kenics static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper. The polymer properties are then validated The non-polymer portions removed in the devolatilization step pass through various pieces of equipment which separate most of the ethylene which is removed from the system to a vent destruction unit (it is, however, recycled in manufacturing units). Most of the solvent is recycled back to the reactor after passing through purification beds. This solvent can still have unreacted co-monomer in it that is fortified with fresh co-monomer prior to re-entry to the reactor. This fortification of the co-monomer is an essential part of the product density control method. This recycle solvent can still have some hydrogen which is then fortified with fresh hydrogen to achieve the polymer molecular weight target. A very small amount of solvent leaves the system as a co-product due to solvent carrier in the catalyst streams and a small amount of solvent that is part of commercial grade co-monomers. Tables 1-3 summarize the conditions for polymerization for examples of this invention Production of Comparative Example 2

All (co)monomer feeds (ethylene, 1-octene) and the process solvent (a narrow boiling range high-purity isoparaffinic solvent trademarked Isopar E and commercially available from Exxon Mobil Corporation) are purified with molecular sieves before introduction into the reaction environment. High purity hydrogen is supplied by a shared pipeline; it is mechanically pressurized to above reaction pressure at 500 psig prior to delivery to the reactors; and it is not further purified on site other than to remove any potential residual moisture. The reactor monomer feed (ethylene) streams are pressurized via mechanical compressor to above reaction pressure at 500 psig. The solvent feeds are mechanically pressurized to above reaction pressure at 500 psig. The comonomer (1-octene) feed is also mechanically pressurized to above reaction pressure at 500 psig and is injected directly into the feed stream for the first reactor. Three catalyst components are injected into the first reactor (CAT-B, RIBS-2, and MMAO-3A). The RIBS-2 catalyst component is diluted to a predefined concentration at the supplier. The CAT-B and MMAO-3A catalyst components are further batch-wise diluted on site to the desired plant concentration with purified solvent (Isopar E) prior to injection into the reactor. Two catalyst components are injected into the second reactor (Ziegler-Natta premix, and triethylaluminum (TEA)). All catalyst components are independently mechanically pressurized to above reaction pressure at 500 psig. All reactor catalyst feed flows are measured with mass flow meters and independently controlled with positive displacement metering pumps.

The continuous solution polymerization reactors consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 10° C. to 50° C. and typically 15° C. by passing the feed stream through a series of heat exchangers. The fresh comonomer feed to the polymerization reactors can be aligned to add comonomer to one of three choices: the first reactor, the second reactor, or the common solvent where it is then split between both reactors proportionate to the shared solvent feed split. In this example the comonomer is fed to the first reactor. The total fresh feed to each polymerization reactor is injected into the reactor at two locations per reactor roughly with equal reactor volumes between each injection location. The fresh feed to the first reactor is controlled typically with each injector receiving half of the total fresh feed mass flow. The fresh feed to the second reactor in series is controlled typically to maintain half of the total ethylene mass flow near each injector, and since the non-reacted ethylene from the first reactor enters the second reactor adjacent to the fresh feed this injector usually has less than half of the total fresh feed mass flow to the second reactor. The catalyst components for the first reactor are injected into the polymerization reactor through specially designed injection stingers and are each separately injected into the same relative location in the first reactor with no contact time prior to the reactor. The catalyst components for the second reactor (Ziegler-Nana and TEA) are injected into the second polymerization reactor through specially designed injection stingers and are each injected into the same relative location in the second reactor.

The primary catalyst component feed for each reactor (CAT-B for the first reactor and a Ziegler-Natta premix for the second reactor) is computer controlled to maintain the individual reactor monomer concentration at a specified target. The cocatalyst components (RIBS-2 and MMAO-3A for the first reactor and TEA for the second reactor) are fed based on calculated specified molar ratios to the primary catalyst component. Immediately following each fresh injection location (either feed or catalyst), the feed streams are mixed with the circulating polymerization reactor contents with Kenics static mixing elements. The contents of each reactor are continuously circulated through heat exchangers responsible for removing much of the heat of reaction and with the temperature of the coolant side responsible for maintaining an isothermal reaction environment at the specified reactor temperature. Circulation around each reactor loop is provided by a screw pump. The effluent from the first polymerization reactor (containing solvent, monomer, comonomer, hydrogen, catalyst components, and dissolved polymer) exits the first reactor loop and passes through a control valve (responsible for controlling the pressure of the first reactor at a specified target) and is injected into the second polymerization reactor of similar design. After the stream exits the second reactor it is contacted with water to stop the reaction (this water is delivered as water of hydration contained with calcium stearate). In addition, various additives such as antioxidants (typically Irganox 1010), are also added at this point. The stream then goes through another set of Kenics static mixing elements to evenly disperse the water catalyst kill and any additives.

Following additive addition, the effluent (containing solvent, monomer, comonomer, hydrogen, catalyst components, and dissolved polymer) passes through a heat exchanger to raise the stream temperature in preparation for separation of the polymer from the other lower boiling reaction components. The stream then enters a two stage separation and devolatization system where the polymer is removed from the solvent, hydrogen, and non-reacted monomer and comonomer. The recycled stream is purified before entering the reactor again. The separated and devolatized polymer melt is then combined with a small side stream of additional additives contained within a polymer melt injected into the process by a single screw extruder. These additives (typically Irganox 1076 and Irgafos 168) are mixed with the main process polymer melt by another series of Kenics static mixing element. The fully additive loaded polymer stream then enters a die specially designed for underwater pelletization, is cut into uniform solid pellets, dried, and transferred into a hopper. During transfer to the hopper, a dry blend of fluoroelastomer processing aid is added to the polymer pellet stream.

The non-polymer portions removed in the devolatilization step pass through various pieces of equipment which separate most of the monomer which is removed from the system, cooled, mechanically compressed, and sent via pipeline back to a light hydrocarbons processing plant for reuse. Most of the solvent and comonomer are recycled back to the reactor after passing through purification beds. This solvent can still have non-reacted co-monomer in it that is fortified with fresh co-monomer prior to re-entry to the reactor as previously discussed. This fortification of the co-monomer is an essential part of the product density control method. This recycle solvent can contain some dissolved hydrogen which is then fortified with fresh hydrogen to achieve the polymer molecular weight target. A very small amount of solvent temporarily leaves the system where it is purified and reused or purged from the system as a co-product.

Tables 5-7 summarize the conditions for polymerization for Comparative Example 2 of this invention.

Inventive Ethylene-Based Polymer Compositions
(Inventive Examples 1-8)

Inventive ethylene-based polymer compositions, i.e. Inventive Example 1-8, are prepared according to the above procedure. The inventive examples are in the general $I_2$ melt index range of from 0.3-0.9 with densities in the range of 0.918 to 0.936 g/cm³. The process conditions are reported in Table 1-3. Inventive Examples 1-8 were tested for various properties according to the test methods described below, and these properties are reported in Tables 8-20.

Comparative Ethylene-Based Compositions
(Comparative Examples 1-2)

Comparative Example 1 is an ethylene/1-octene polyethylene produced by a Ziegler-Natta catalyst with a $I_2$ of approximately 0.5 g/10 minutes and a density of 0.9275 g/cm³.

Comparative Example 2 is an ethylene/1-octene polyethylene produced by a Ziegler-Natta catalyst with an $I_2$ of approximately 0.8 g/10 minutes and a density of 0.9248 g/cm³. Comparative Example 2 was produced according to the procedure described hereinabove for production of Comparative Example 2, under conditions reported in Tables 5-7.

Characterization properties of the Inventive Examples 1-8 and Comparative Example 1 and 2 are reported in Table 8-20.

DSC data are reported in Table 9. The melting points, percent crystallinities, and cooling temperatures for the Comparative Examples are within the range of these properties shown for the Inventive examples.

DMS viscosity, tan delta, and complex modulus versus phase angle data are given in Tables 10-13, respectively, and plotted in FIGS. 5-7, respectively. The viscosity data of Table 10 and FIG. 5 as well as the viscosity at 0.1 rad/s over that at 100 rad/s in Table 10 show that many of the Inventive Examples show high shear thinning behavior of viscosity decreasing rapidly with increasing frequency as compared to the Comparative Examples. From Table 11 and FIG. 6, many of the Inventive Examples have low tan delta values or high elasticity as compared to the Comparative Examples. Table 13 and FIG. 7 shows a form of the DMS data which is not influenced as greatly by the overall melt index (MI or $I_2$) or molecular weight. The more elastic materials are lower on this plot (i.e., lower phase angle for a given complex modulus); the Inventive Examples are generally lower on this plot or more elastic than the Comparative Examples.

Melt strength data is shown in Table 15 and plotted in FIGS. 8-9. The melt strengths are influenced by the melt index with the melt index in general being higher for lower melt index materials. Inventive Examples 1 and 2 have high melt strength values, relatively, as compared to the Comparative Examples.

GPC data for the Inventive examples and Comparative Examples are shown in Table 15 and FIGS. 10-11. In general, the Inventive Examples have narrow $M_w/M_n$ of less than 3.7, excluding Inventive example 8 of a broad $M_w/M_n$ of 8.9.

Zero shear viscosity (ZSV) data for the Inventive Examples and Comparative Examples are shown in Table 16. In general, the Inventive Examples have high ZSV ratios as compared to the Comparative Examples Unsaturation data for the Inventive examples and Comparative Examples are shown in Table 17. The Inventive Examples have very low total unsaturation values as compared to the Comparative Examples. All other unsaturation values (vinylene, trisubstituted, vinyl, and vinylidene) are also lower for the Inventive examples as compared to the Comparative Examples.

The MW Ratio is measured by cross fractionation (TREF followed by GPC) for the Inventive Examples and Comparative Examples. The MW Ratio is shown in Tables 19 and 20 and FIGS. 14-15. The Inventive Examples have MW Ratio values increasing from a low value (close to 0.10) with temperature, and reaching a maximum value of 1.00 at the highest temperature with these values monotonically increasing. The Comparative Examples having MW Ratio values larger than 1.00 for some temperatures and some MW Ratios at higher temperatures being lower than MW Ratio values at lower temperatures. In addition, the Inventive Examples have MW Ratios for the temperatures ≤50° C. of less than 0.10, while the Comparative Examples have MW Ratios larger than 0.10 for some temperatures ≤50° C. The Inventive Examples have a cumulative weight fraction less than 0.10 for the temperature fractions up to 50° C.

Short chain branching distribution data are shown in Table 18 and FIGS. 12-13. The Inventive Examples have higher CDC and Comonomer Distribution Index than the Comparative Examples. The Inventive Examples have a monomodal or bimodal distribution excluding the soluble fraction at temperature ~30° C.

Inventive Films 1-8

Inventive ethylene-based polymer compositions, Inventive Example 1-8 are blown into Inventive Monolayer Films 1-8 on a mono layer blown film line. Inventive Films 1-8 are produced at a 2 mil thickness. The blown film line consists of a single 2.5 inch Davis Standard barrier H screw DSBII. The length/diameter (L/D) ratio for the screw is 30:1. The blown film line has a 6 inch die diameter with a dual lip air ring cooling system and a screen pack configuration of 20:40:60:80:20 mesh The film fabrication conditions are reported in Table 21.

The Inventive Films 1-8 are tested for their various properties according to the test methods described below, and these properties are reported in Table 28.

Comparative Films 1 and 2

Comparative ethylene-based polymer compositions, Comparative Example 1 and 2 into Comparative Films 1 and 2 on a mono layer blown film line. Comparative Films 1 and 2 are produced at a 2 mil thickness. The blown film line consists of a single 2.5 inch Davis Standard barrier II screw DSBII. The length/diameter (L/D) ratio for the screw is 30:1. The blown film line has a 6 inch die diameter with a dual lip air ring cooling system and a screen pack configuration of 20:40:60:80:20 mesh The film fabrication conditions are reported in Table 21. The Inventive Films 1-8 are tested for their various properties according to the test methods described below, and these properties are reported in Table 28.

Inventive Blend 1-8 and Comparative Blend 1-2

Inventive Blends 3-8 are a blend of 65 wt % Inventive Examples 3-8 respectively with 35 wt % high pressure low density polyethylene, Dow LDPE 132I, a 0.2 melt index, 0.919 g/cc density LDPE and run under fabrication Condition set 1 as shown in Table 21.

Inventive Blends 1-2 are a blend of 65 wt % Inventive Examples 1-2 respectively with 35 wt % high pressure low density polyethylene, Dow LDPE 132I, a 0.2 melt index, 0.919 g/cc density LDPE and run under fabrication Condition set 2 as shown in Table 21.

Comparative Blends 1 and 2 are a blend of 65 wt % Comparative Examples 1 and 2 respectively with 35 wt % Dow LDPE 132I resin and run under fabrication Conditions set 1 as shown in Table 21.

Comparative Blends 3 and 4 are a blend of 65 wt % Comparative Examples 1 and 2 respectively with 35 wt %, Dow LDPE 132I resin and run under fabrication Conditions set 2 as shown in Table 21.

The Inventive Blends 3-8 and Comparative Blends 1 and 2 are tested for their various properties according to the test methods described below, and these properties are reported in Table 22-23.

The Inventive Films 1-2 and Comparative Blends 3 and 4 are tested for their various properties according to the test methods described below, and these properties are reported in Table 24-25.

Inventive blends 3-8 show good MD and CD shrink tension and free shrink, which is advantageous for use in shrink film, good optics (haze, gloss, clarity), and generally good film properties (puncture, dart, and tear) when compared to Comparative blends 1 and 2.

Inventive Blends 1-2 show good MD and CD shrink tension and free shrink, which is advantageous for use in shrink film, good optics (haze, gloss, clarity), and generally good film properties (puncture, dart, and tear) when compared to Comparative Blends 3 and 4.

Inventive Blend 9-16 and Comparative Blend 5-6

Inventive Blends 9-16 are a blend of 20 wt % Inventive Examples 1-8 respectively with 80 wt % high pressure low density polyethylene, Dow LDPE 132I, a 0.2 melt index, 0.919 g/cc density LDPE. Comparative Blends 5-6 are a blend of 20 wt % Comparative Examples 1-2 respectively with 80 wt % high pressure low density polyethylene, Dow LDPE 132I.

Inventive blends 9-16 and Comparative Blends 5 and 6 were run under conditions set 3 as shown in Table 21.

The film properties of the Inventive Blends 9-16 and Comparative blends 5 and 6 are shown in Tables 27-28.

The Inventive blends 9-16 show good MD and CD shrink tension and free shrink, which is advantageous for use in shrink film, good optics (haze, gloss, clarity), and generally good film properties (puncture, dart, and tear). The Inventive blends 9-16 show higher shrink tension coupled with higher puncture and good haze, while maintaining a high secant modulus as compared to the Comparative blends 5-6.

TABLE 1

Process reactor feeds used to make Examples.

| 1. REACTOR FEEDS | IE.. 1 | IE. 2 | IE. 3 | IE. 4 | IE. 5 | IE. 6 | IE. 7 | IE. 8 |
|---|---|---|---|---|---|---|---|---|
| Primary Reactor Feed Temperature (° C.) | 40.0 | 40.0 | 40.0 | 20.0 | 20.0 | 20.0 | 40.0 | 40.0 |
| Primary Reactor Total Solvent Flow (lb/hr) | 788 | 710 | 924 | 1007 | 1058 | 997 | 869 | 924 |
| Primary Reactor Fresh Ethylene Flow (lb/hr) | 151 | 117 | 133 | 165 | 184 | 183 | 125 | 161 |
| Primary Reactor Total Ethylene Flow (lb/hr) | 158 | 123 | 143 | 174 | 193 | 192 | 134 | 169 |
| Comonomer Type | 1-octene | 1-octene | 1-octene | 1-octene | 1-octene | 1-octene | 1-octene | 1-octene |
| Primary Reactor Fresh Comonomer Flow (lb/hr) | 0.0 | 0.0 | 0.0 | 0.0 | 0.0 | 0.0 | 3.2 | 0.0 |
| Primary Reactor Total Comonomer Flow (lb/hr) | 14.6 | 11.9 | 8.6 | 32.9 | 26.1 | 25.0 | 7.0 | 20.7 |
| Primary Reactor Feed Solvent/Ethylene Ratio | 5.22 | 6.07 | 6.94 | 6.10 | 5.74 | 5.45 | 6.95 | 5.73 |
| Primary Reactor Fresh Hydrogen Flow (sccm) | 4474 | 2740 | 2175 | 5024 | 7265 | 7438 | 1736 | 187 |
| Primary Reactor Hydrogen mole % | 0.43 | 0.34 | 0.23 | 0.47 | 0.60 | 0.63 | 0.20 | 0.02 |
| Secondary Reactor Feed Temperature (° C.) | 40.2 | 39.8 | 40.0 | 20.3 | 20.3 | 19.2 | 40.2 | 39.7 |
| Secondary Reactor Total Solvent Flow (lb/hr) | 439.6 | 340.8 | 327.8 | 361.8 | 389.9 | 418.6 | 280.7 | 339.2 |

TABLE 1-continued

Process reactor feeds used to make Examples.

| 1. REACTOR FEEDS | IE. 1 | IE. 2 | IE. 3 | IE. 4 | IE. 5 | IE. 6 | IE. 7 | IE. 8 |
|---|---|---|---|---|---|---|---|---|
| Secondary Reactor Fresh Ethylene Flow (lb/hr) | 142.0 | 127.9 | 118.1 | 136.1 | 147.1 | 157.0 | 101.1 | 123.0 |
| Secondary Reactor Total Ethylene Flow (lb/hr) | 145.8 | 131.0 | 121.4 | 139.0 | 150.3 | 160.6 | 103.9 | 125.6 |
| Secondary Reactor Fresh Comonomer Flow (lb/hr) | 14.3 | 11.6 | 6.2 | 30.8 | 27.1 | 20.5 | 0.0 | 26.5 |
| Secondary Reactor Total Comonomer Flow (lb/hr) | 22.2 | 17.1 | 9.2 | 41.6 | 36.0 | 30.3 | 1.2 | 33.5 |
| Secondary Reactor Feed Solvent/Ethylene Ratio | 3.10 | 2.66 | 2.78 | 2.66 | 2.65 | 2.67 | 2.78 | 2.76 |
| Secondary Reactor Fresh Hydrogen Flow (sccm) | 2223 | 2799 | 4836 | 593 | 1223 | 1008 | 4136 | 12466 |
| Secondary Reactor Hydrogen Mole % | 0.234 | 0.327 | 0.609 | 0.067 | 0.128 | 0.099 | 0.610 | 1.497 |
| Fresh Comonomer injection location | Secondary Reactor | Secondary Reactor | Secondary Reactor | Secondary Reactor | Secondary Reactor | Secondary Reactor | Primary Reactor | Secondary Reactor |
| Ethylene Split (wt %) | 52.0 | 48.5 | 54.0 | 55.6 | 56.3 | 54.4 | 56.3 | 57.3 |

IE = Inventive Example

TABLE 2

Process reaction conditions used to make Examples.

| 2. REACTION | IE. 1 | IE. 2 | IE. 3 | IE. 4 | IE. 5 | IE. 6 | IE. 7 | IE. 8 |
|---|---|---|---|---|---|---|---|---|
| Primary Reactor Control Temperature (° C.) | 160 | 160 | 180 | 165 | 140 | 155 | 180 | 155 |
| Primary Reactor Pressure (Psig) | 725 | 725 | 725 | 725 | 725 | 725 | 725 | 725 |
| Primary Reactor Ethylene Conversion (wt %) | 74.8 | 79.4 | 70.5 | 72.8 | 71.3 | 70.7 | 90.2 | 70.0 |
| Primary Reactor FTnIR Outlet [C2] (g/L) | 25.1 | 18.3 | 23.3 | 24.0 | 27.1 | 28.4 | 8.0 | 28.2 |
| Primary Reactor 10log Viscosity (log(cP) | 3.21 | 3.33 | 2.65 | 2.76 | 3.32 | 2.99 | 2.67 | 3.23 |
| Primary Reactor Polymer Concentration (wt %) | 12.8 | 12.2 | 9.6 | 11.3 | 11.5 | 11.8 | 12.4 | 11.2 |
| Primary Reactor Exchanger's Heat Transfer Coefficient (BTU/(hr ft$^{2\circ}$ F.)) | 9.0 | 9.7 | 10.3 | 9.2 | 7.6 | 8.5 | 9.5 | 7.5 |
| Primary Reactor Polymer Residence Time (hr) | 0.35 | 0.40 | 0.31 | 0.28 | 0.27 | 0.28 | 0.34 | 0.31 |
| Secondary Reactor Control Temperature (° C.) | 190 | 190 | 190 | 190 | 190 | 190 | 190 | 190 |
| Secondary Reactor Pressure (Psig) | 738 | 741 | 728 | 729 | 731 | 730 | 729 | 729 |
| Secondary Reactor Ethylene Conversion (wt %) | 89.7 | 89.6 | 88.1 | 90.2 | 91.1 | 88.3 | 85.2 | 91.3 |
| Secondary Reactor FTnIR Outlet [C2] (g/L) | 7.6 | 7.7 | 7.7 | 6.7 | 6.3 | 8.8 | 7.6 | 6.1 |
| Secondary Reactor 10log Viscosity (log(cP)) | 2.99 | 3.10 | 2.55 | 2.75 | 2.89 | 2.85 | 2.40 | 2.60 |
| Secondary Reactor Polymer Concentration (wt %) | 21.1 | 20.6 | 17.4 | 21.0 | 21.3 | 21.3 | 16.6 | 21.1 |
| Secondary Reactor Exchanger's Heat Transfer Coefficient (BTU/(hr ft$^{2\circ}$ F.)) | 41.1 | 39.1 | 40.2 | 35.9 | 35.5 | 34.3 | 44.1 | 38.0 |
| Secondary Reactor Polymer Residence Time (hr) | 0.13 | 0.15 | 0.13 | 0.12 | 0.11 | 0.11 | 0.14 | 0.13 |
| Overall Ethylene conversion by vent (wt %) | 93.7 | 93.6 | 92.7 | 94.2 | 94.6 | 92.8 | 92.7 | 94.8 |

IE = Inventive Example

TABLE 3

Catalyst conditions used to make Examples.

| 3. CATALYST | IE. 1 | IE. 2 | IE. 3 | IE. 4 | IE. 5 | IE. 6 | IE. 7 | IE. 8 |
|---|---|---|---|---|---|---|---|---|
| Primary Reactor: | | | | | | | | |
| Catalyst Type | CAT-A | CAT-A | CAT-A | CAT-A | CAT-A | CAT-A | CAT-A | CAT-B |
| Catalyst Flow (lb/hr) | 1.90 | 1.32 | 0.74 | 1.11 | 0.66 | 0.81 | 1.60 | 1.04 |
| Catalyst Concentration (ppm) | 17 | 17 | 35 | 18 | 18 | 18 | 35 | 50 |
| Catalyst Efficiency (Mlbs poly/lb Zr) | 3.8 | 4.5 | 3.9 | 6.8 | 12.4 | 9.8 | 2.2 | 2.4 |
| Catalyst Metal Molecular Weight (g/mol) | 90.86 | 90.86 | 90.86 | 90.86 | 90.86 | 90.86 | 90.86 | 47.38 |
| Co-Catalyst-1 Molar Ratio | 1.9 | 1.6 | 1.4 | 1.9 | 2.1 | 1.7 | 1.5 | 1.2 |
| Co-Catalyst-1 Type | RIBS-2 | RIBS-2 | RIBS-2 | RIBS-2 | RIBS-2 | RIBS-2 | RIBS-2 | RIBS-2 |
| Co-Catalyst-1 Flow (lb/hr) | 0.70 | 0.45 | 1.10 | 0.80 | 0.43 | 0.43 | 1.04 | 0.46 |
| Co-Catalyst-1 Concentration (ppm) | 1153 | 1153 | 498 | 596 | 596 | 596 | 1094 | 3478 |
| Co-Catalyst-2 Molar Ratio | 8.9 | 9.0 | 7.0 | 6.8 | 6.7 | 6.9 | 6.9 | 5.0 |
| Co-Catalyst-2 Type | MMAO-3A | MMAO-3A | MMAO-3A | MMAO-3A | MMAO-3A | MMAO-3A | MMAO-3A | MMAO-3A |
| Co-Catalyst-2 Flow (lb/hr) | 0.51 | 0.36 | 0.54 | 0.40 | 0.24 | 0.29 | 0.58 | 0.99 |
| Co-Catalyst-2 Concentration (ppm) | 166 | 166 | 100 | 100 | 100 | 100 | 199 | 148 |
| Secondary Reactor: | | | | | | | | |
| Catalyst Type | CAT-A | CAT-A | CAT-A | CAT-A | CAT-A | CAT-A | CAT-A | CAT-A |
| Catalyst Flow (lb/hr) | 1.5 | 1.5 | 1.6 | 2.1 | 2.6 | 1.9 | 1.3 | 2.7 |

TABLE 3-continued

Catalyst conditions used to make Examples.

| 3. CATALYST | IE. 1 | IE. 2 | IE. 3 | IE. 4 | IE. 5 | IE. 6 | IE. 7 | IE. 8 |
|---|---|---|---|---|---|---|---|---|
| Catalyst Concentration (ppm) | 74 | 74 | 72 | 60 | 60 | 60 | 76 | 74 |
| Catalyst Efficiency (Mlbs poly/lb Zr) | 1.8 | 1.5 | 1.3 | 1.7 | 1.5 | 2.1 | 1.0 | 1.0 |
| Co-Catalyst-1 Molar Ratio | 1.5 | 1.5 | 1.3 | 1.5 | 1.5 | 1.5 | 1.2 | 1.2 |
| Co-Catalyst-1 Type | RIBS-2 | RIBS-2 | RIBS-2 | RIBS-2 | RIBS-2 | RIBS-2 | RIBS-2 | RIBS-2 |
| Co-Catalyst-1 Flow (lb/hr) | 2.0 | 1.9 | 4.0 | 1.4 | 1.7 | 1.3 | 1.5 | 0.9 |
| Co-Catalyst-1 Concentration (ppm) | 1153 | 1153 | 498 | 1799 | 1799 | 1799 | 1094 | 3478 |
| Co-Catalyst-2 Molar Ratio | 7.0 | 7.0 | 7.0 | 7.0 | 7.0 | 7.0 | 6.9 | 7.0 |
| Co-Catalyst-2 Type | MMAO-3A | MMAO-3A | MMAO-3A | MMAO-3A | MMAO-3A | MMAO-3A | MMAO-3A | MMAO-3A |
| Co-Catalyst-2 Flow (lb/hr) | 1.4 | 1.4 | 2.5 | 2.6 | 3.2 | 2.4 | 1.1 | 2.8 |
| Co-Catalyst-2 Concentration (ppm) | 166 | 166 | 100 | 100 | 100 | 100 | 199 | 148 |

TABLE 4

Catalysts and catalyst components detailed nomenclature.

| Description | CAS Name |
|---|---|
| CAT-A | Zirconium, [2,2'''-[1,3-propanediylbis(oxy-κO)]bis[3'',5,5''-tris(1,1-dimethylethyl)-5'-methyl[1,1':3',1''-terphenyl]-2'-olato-κO]]dimethyl-, (OC-6-33)- |
| CAT-B | [N-(1,1-dimethylethyl)-1,1-dimethyl-1-[(1,2,3,3a,8a-η)-1,5,6,7-tetrahydro-2-methyl-s-indacen-1-yl]silanaminato(2-)-κN][(1,2,3,4-η)-1,3-pentadiene]- |
| RIBS-2 | Amines, bis(hydrogenated tallow alkyl)methyl, tetrakis(pentafluorophenyl)borate(1-) |
| MMAO-3A | Aluminoxanes, iso-Bu Me, branched, cyclic and linear; modified methyl aluminoxane |

TABLE 5

Process reactor feeds used to make Comparative Example 2.
1. REACTOR FEEDS

| | |
|---|---|
| Primary Reactor Feed Temperature (° C.) | 11.9 |
| Primary Reactor Total Solvent Flow (k lb/hr) | 105.4 |
| Primary Reactor Fresh Ethylene Flow (k lb/hr) | 18.0 |
| Primary Reactor Total Ethylene Flow (k lb/hr) | 18.9 |
| Comonomer Type | 1-octene |
| Primary Reactor Fresh Comonomer Flow (k lb/hr) | 3.1 |
| Primary Reactor Total Comonomer Flow (k lb/hr) | 6.3 |
| Primary Reactor Feed Solvent/Ethylene Ratio | 5.7 |
| Primary Reactor Fresh Hydrogen Flow (lb/hr) | 0.68 |
| Primary Reactor Hydrogen mole % | 0.05 |
| Secondary Reactor Feed Temperature (° C.) | 11.6 |
| Secondary Reactor Total Solvent Flow (k lb/hr) | 54.9 |
| Secondary Reactor Fresh Ethylene Flow (k lb/hr) | 21.5 |
| Secondary Reactor Total Ethylene Flow (k lb/hr) | 22.0 |
| Secondary Reactor Fresh Comonomer Flow (k lb/hr) | 0.0 |
| Secondary Reactor Total Comonomer Flow (k lb/hr) | 1.7 |
| Secondary Reactor Feed Solvent/Ethylene Ratio | 2.6 |
| Secondary Reactor Fresh Hydrogen Flow (lb/hr) | 4.3 |
| Secondary Reactor Hydrogen Mole % | 0.28 |
| Fresh Comonomer injection location | Primary Reactor |
| Ethylene Split (wt %) | 46.2 |

TABLE 6

Process reactor conditions used to make Comparative Example 2.
2. REACTION

| | |
|---|---|
| Primary Reactor Control Temperature (° C.) | 135 |
| Primary Reactor Pressure (Psig) | 500 |
| Primary Reactor Ethylene Conversion (wt %) | 78.0 |
| Primary Reactor FTnIR Outlet [C2] (g/L) | 20.3 |
| Primary Reactor 10log Viscosity (log(cP)) | 3.08 |
| Primary Reactor Polymer Concentration (wt %) | 13.6 |
| Primary Reactor Exchanger's Heat Transfer Coefficient (BTU/(hr ft$^2$ ° F.)) | 42.6 |
| Primary Reactor Polymer Residence Time (min) | 14.8 |
| Secondary Reactor Control Temperature (° C.) | 195 |
| Secondary Reactor Pressure (Psig) | 500 |
| Secondary Reactor Ethylene Conversion (wt %) | 88.7 |
| Secondary Reactor FTnIR Outlet [C2] (g/L) | 8.5 |
| Secondary Reactor 10log Viscosity (log(cP)) | 2.95 |
| Secondary Reactor Polymer Concentration (wt %) | 20.0 |
| Secondary Reactor Exchanger's Heat Transfer Coefficient (BTU/(hr ft$^2$ ° F.)) | 20.4 |
| Secondary Reactor Polymer Residence Time (min) | 9.0 |
| Overall Ethylene conversion by vent (wt %) | 92.8 |
| Total production rate (k lb/hr) | 41.0 |

TABLE 7

Catalyst conditions used to make Comparative Example 2.
3. CATALYST

| | |
|---|---|
| Primary Reactor Catalyst Type | CAT-B |
| Primary Reactor Catalyst Flow (lb/hr) | 19.0 |
| Primary Reactor Catalyst Concentration (wt %) | 0.30 |
| Primary Reactor Catalyst Efficiency (Mlbs poly/lb Ti) | 2.6 |
| Primary Reactor Catalyst Metal Molecular Weight (g/mol) | 47.9 |
| Primary Reactor Co-Catalyst-1 Molar Ratio | 1.2 |
| Primary Reactor Co-Catalyst-1 Type | RIBS-2 |
| Primary Reactor Co-Catalyst-1 Flow (lb/hr) | 11.0 |
| Primary Reactor Co-Catalyst-1 Concentration (wt %) | 1.80 |
| Primary Reactor Co-Catalyst-2 Molar Ratio | 1.0 |
| Primary Reactor Co-Catalyst-2 Type | MMAO-3A |
| Primary Reactor Co-Catalyst-2 Flow (lb/hr) | 3.70 |
| Primary Reactor Co-Catalyst-2 Concentration (wt % Al) | 0.10 |
| Secondary Reactor Catalyst Type | Ziegler-Natta |
| Secondary Reactor Catalyst Flow (lb/hr) | 69.8 |
| Secondary Reactor Catalyst Concentration (ppm Ti) | 800 |
| Secondary Reactor Catalyst Efficiency (Mlbs poly/lb Ti) | 0.42 |
| Secondary Reactor Co-Catalyst-1 Molar Ratio | 5.0 |
| Secondary Reactor Co-Catalyst-1 Type | TEA |
| Secondary Reactor Co-Catalyst-1 Flow (lb/hr) | 6.6 |
| Secondary Reactor Co-Catalyst-1 Concentration (wt % Al) | 2.37 |

TABLE 8

| Sample | Melt Index $I_2$ at 190° C. (g/10 min) | Melt Index $I_{10}$ at 190° C. (g/10 min) | $I_{10}/I_2$ | Density (g/cm$^3$) |
|---|---|---|---|---|
| IE. 1 | 0.49 | 4.6 | 9.4 | 0.9276 |
| IE. 2 | 0.32 | 3.4 | 10.8 | 0.9279 |
| IE. 3 | 0.54 | 6.0 | 11.0 | 0.9341 |
| IE. 4 | 0.75 | 6.4 | 8.4 | 0.9180 |

TABLE 8-continued

| Sample | Melt Index I$_2$ at 190° C. (g/10 min) | Melt Index I$_{10}$ at 190° C. (g/10 min) | I$_{10}$/I$_2$ | Density (g/cm$^3$) |
|---|---|---|---|---|
| IE. 5 | 0.89 | 7.5 | 8.4 | 0.9247 |
| IE. 6 | 0.91 | 7.1 | 7.8 | 0.9248 |
| IE. 7 | 0.52 | 6.2 | 11.9 | 0.9357 |
| IE. 8 | 0.87 | 12.4 | 14.3 | 0.9262 |
| CE. 1 | 0.52 | 3.8 | 7.4 | 0.9275 |
| CE. 2 | 0.80 | 6.6 | 8.3 | 0.9248 |

IE = Inventive Example
CE = Comparative Example

TABLE 9

| Sample | T$_m$ (° C.) | Heat of Fusion (J/g) | % Cryst. | T$_c$ (° C.) |
|---|---|---|---|---|
| IE. 1 | 121.2 | 159.8 | 54.7 | 109.2 |
| IE. 2 | 120.7 | 161.4 | 55.3 | 109.2 |
| IE. 3 | 124.7 | 180.5 | 61.8 | 112.4 |
| IE. 4 | 116.5 | 143.9 | 49.3 | 103.8 |
| IE. 5 | 119.8 | 157.1 | 53.8 | 106.4 |
| IE. 6 | 120.2 | 152.0 | 52.1 | 106.2 |
| IE. 7 | 125.6 | 178.9 | 61.3 | 113.1 |
| IE. 8 | 117.4 | 163.5 | 56.0 | 105.4 |
| CE. 1 | 121.8 | 156.0 | 53.4 | 109.5 |
| CE. 2 | 123.3 | 169.2 | 57.9 | 109.3 |

TABLE 10

DMS viscosity data of Examples and Comparative Examples

| Frequency (rad/s) | Viscosity in Pa-s | | | | | | | | | |
|---|---|---|---|---|---|---|---|---|---|---|
| | IE. 1 | IE. 2 | IE. 3 | IE. 4 | IE. 5 | IE. 6 | IE. 7 | IE. 8 | CE. 1 | CE. 2 |
| 0.10 | 21,683 | 32,760 | 21,386 | 12,784 | 10,115 | 10,031 | 25,175 | 15,698 | 15,230 | 13,218 |
| 0.16 | 19,417 | 28,361 | 18,839 | 11,896 | 9,527 | 9,477 | 22,071 | 13,738 | 14,688 | 12,176 |
| 0.25 | 17,238 | 24,423 | 16,438 | 10,934 | 8,913 | 8,858 | 19,079 | 11,899 | 14,058 | 11,146 |
| 0.40 | 15,195 | 21,002 | 14,216 | 9,937 | 8,274 | 8,196 | 16,285 | 10,236 | 13,318 | 10,127 |
| 0.63 | 13,354 | 17,977 | 12,224 | 8,957 | 7,645 | 7,532 | 13,780 | 8,764 | 12,502 | 9,167 |
| 1.00 | 11,663 | 15,364 | 10,491 | 8,026 | 7,024 | 6,877 | 11,558 | 7,485 | 11,603 | 8,279 |
| 1.58 | 10,153 | 13,083 | 8,983 | 7,157 | 6,412 | 6,246 | 9,648 | 6,371 | 10,642 | 7,439 |
| 2.51 | 8,783 | 11,126 | 7,677 | 6,343 | 5,794 | 5,633 | 8,013 | 5,399 | 9,628 | 6,678 |
| 3.98 | 7,571 | 9,466 | 6,537 | 5,617 | 5,193 | 5,063 | 6,670 | 4,551 | 8,573 | 5,927 |
| 6.31 | 6,523 | 7,951 | 5,542 | 4,919 | 4,570 | 4,491 | 5,585 | 3,804 | 7,505 | 5,219 |
| 10.00 | 5,537 | 6,573 | 4,660 | 4,275 | 3,958 | 3,943 | 4,650 | 3,146 | 6,458 | 4,538 |
| 15.85 | 4,620 | 5,423 | 3,882 | 3,672 | 3,361 | 3,414 | 3,866 | 2,568 | 5,462 | 3,890 |
| 25.12 | 3,843 | 4,412 | 3,194 | 3,090 | 2,780 | 2,891 | 3,180 | 2,066 | 4,522 | 3,258 |
| 39.81 | 3,147 | 3,544 | 2,597 | 2,581 | 2,270 | 2,426 | 2,622 | 1,635 | 3,670 | 2,702 |
| 63.10 | 2,543 | 2,805 | 2,086 | 2,117 | 1,817 | 1,998 | 2,139 | 1,273 | 2,919 | 2,197 |
| 100.00 | 2,019 | 2,195 | 1,654 | 1,708 | 1,424 | 1,611 | 1,719 | 976 | 2,278 | 1,755 |
| Viscosity 0.1/100 | 10.7 | 14.9 | 12.9 | 7.5 | 7.1 | 6.2 | 14.6 | 16.1 | 6.7 | 7.5 |

TABLE 11

DMS tan delta data of Examples and Comparative Examples.

| Freq | Tan Delta | | | | | | | | | |
|---|---|---|---|---|---|---|---|---|---|---|
| | IE. 1 | IE. 2 | IE. 3 | IE. 4 | IE. 5 | IE. 6 | IE. 7 | IE. 8 | CE. 1 | CE. 2 |
| 0.10 | 2.76 | 2.02 | 2.35 | 4.27 | 5.14 | 5.38 | 2.27 | 2.17 | 7.44 | 3.94 |
| 0.16 | 2.50 | 1.90 | 2.15 | 3.67 | 4.52 | 4.58 | 2.01 | 2.01 | 6.13 | 3.50 |
| 0.25 | 2.32 | 1.81 | 1.99 | 3.23 | 4.05 | 3.99 | 1.83 | 1.88 | 5.31 | 3.20 |
| 0.40 | 2.18 | 1.75 | 1.88 | 2.91 | 3.67 | 3.57 | 1.68 | 1.78 | 4.53 | 2.96 |
| 0.63 | 2.07 | 1.70 | 1.80 | 2.68 | 3.35 | 3.24 | 1.58 | 1.71 | 3.88 | 2.79 |
| 1.00 | 1.98 | 1.65 | 1.74 | 2.49 | 3.05 | 2.98 | 1.50 | 1.64 | 3.34 | 2.63 |
| 1.58 | 1.89 | 1.60 | 1.68 | 2.34 | 2.75 | 2.74 | 1.45 | 1.57 | 2.87 | 2.47 |
| 2.51 | 1.81 | 1.54 | 1.63 | 2.20 | 2.46 | 2.53 | 1.42 | 1.50 | 2.47 | 2.30 |
| 3.98 | 1.71 | 1.47 | 1.56 | 2.05 | 2.18 | 2.31 | 1.39 | 1.42 | 2.15 | 2.12 |
| 6.31 | 1.60 | 1.39 | 1.48 | 1.91 | 1.92 | 2.10 | 1.37 | 1.32 | 1.86 | 1.93 |
| 10.00 | 1.50 | 1.30 | 1.40 | 1.76 | 1.69 | 1.90 | 1.35 | 1.22 | 1.63 | 1.75 |
| 15.85 | 1.39 | 1.21 | 1.30 | 1.61 | 1.48 | 1.71 | 1.31 | 1.12 | 1.42 | 1.57 |
| 25.12 | 1.28 | 1.12 | 1.21 | 1.46 | 1.31 | 1.53 | 1.26 | 1.02 | 1.24 | 1.41 |
| 39.81 | 1.17 | 1.04 | 1.12 | 1.32 | 1.16 | 1.37 | 1.20 | 0.93 | 1.09 | 1.25 |
| 63.10 | 1.08 | 0.96 | 1.03 | 1.18 | 1.04 | 1.22 | 1.13 | 0.84 | 0.96 | 1.12 |
| 100.00 | 0.98 | 0.88 | 0.94 | 1.06 | 0.93 | 1.09 | 1.05 | 0.76 | 0.85 | 1.00 |

TABLE 12

Complex modulus and phase angle data of Examples 1-5.

| G* (Pa) | IE. 1 Phase Angle | G* (Pa) | IE. 2 Phase Angle | G* (Pa) | IE. 3 Phase Angle | G* (Pa) | IE. 4 Phase Angle | G* (Pa) | IE. 5 Phase Angle |
|---|---|---|---|---|---|---|---|---|---|
| 2.17E+03 | 70.10 | 3.28E+03 | 63.61 | 2.14E+03 | 66.95 | 1.28E+03 | 76.82 | 1.01E+03 | 78.99 |
| 3.08E+03 | 68.23 | 4.49E+03 | 62.20 | 2.99E+03 | 65.01 | 1.89E+03 | 74.75 | 1.51E+03 | 77.52 |
| 4.33E+03 | 66.70 | 6.13E+03 | 61.12 | 4.13E+03 | 63.34 | 2.75E+03 | 72.82 | 2.24E+03 | 76.12 |
| 6.05E+03 | 65.36 | 8.36E+03 | 60.26 | 5.66E+03 | 62.01 | 3.96E+03 | 71.04 | 3.29E+03 | 74.76 |
| 8.43E+03 | 64.26 | 1.13E+04 | 59.58 | 7.71E+03 | 60.98 | 5.65E+03 | 69.53 | 4.82E+03 | 73.37 |
| 1.17E+04 | 63.21 | 1.54E+04 | 58.84 | 1.05E+04 | 60.10 | 8.03E+03 | 68.16 | 7.02E+03 | 71.82 |
| 1.61E+04 | 62.17 | 2.07E+04 | 58.05 | 1.42E+04 | 59.30 | 1.13E+04 | 66.85 | 1.02E+04 | 69.99 |
| 2.21E+04 | 61.02 | 2.79E+04 | 57.05 | 1.93E+04 | 58.42 | 1.59E+04 | 65.52 | 1.46E+04 | 67.85 |
| 3.01E+04 | 59.67 | 3.77E+04 | 55.76 | 2.60E+04 | 57.34 | 2.24E+04 | 64.04 | 2.07E+04 | 65.32 |
| 4.12E+04 | 58.07 | 5.02E+04 | 54.21 | 3.50E+04 | 56.01 | 3.10E+04 | 62.34 | 2.88E+04 | 62.47 |
| 5.54E+04 | 56.24 | 6.57E+04 | 52.41 | 4.66E+04 | 54.38 | 4.28E+04 | 60.36 | 3.96E+04 | 59.34 |
| 7.32E+04 | 54.18 | 8.60E+04 | 50.41 | 6.15E+04 | 52.50 | 5.82E+04 | 58.09 | 5.33E+04 | 56.02 |
| 9.65E+04 | 51.95 | 1.11E+05 | 48.28 | 8.02E+04 | 50.39 | 7.76E+04 | 55.54 | 6.98E+04 | 52.64 |
| 1.25E+05 | 49.59 | 1.41E+05 | 46.08 | 1.03E+05 | 48.12 | 1.03E+05 | 52.75 | 9.04E+04 | 49.29 |
| 1.60E+05 | 47.12 | 1.77E+05 | 43.82 | 1.32E+05 | 45.75 | 1.34E+05 | 49.76 | 1.15E+05 | 46.07 |
| 2.02E+05 | 44.52 | 2.20E+05 | 41.47 | 1.65E+05 | 43.32 | 1.71E+05 | 46.58 | 1.42E+05 | 43.00 |

TABLE 13

Complex modulus and phase angle data of Examples 6-8 and Comparative Examples 1-2.

| G* (Pa) | IE. 6 Phase Angle | G* (Pa) | IE. 7 Phase Angle | G* (Pa) | IE. 8 Phase Angle | G* (Pa) | CE. 1 Phase Angle | G* (Pa) | CE. 2 Phase Angle |
|---|---|---|---|---|---|---|---|---|---|
| 1.00E+03 | 79.47 | 2.52E+03 | 66.21 | 1.57E+03 | 65.31 | 1.52E+03 | 82.35 | 1.32E+03 | 75.78 |
| 1.50E+03 | 77.68 | 3.50E+03 | 63.58 | 2.18E+03 | 63.52 | 2.33E+03 | 80.74 | 1.93E+03 | 74.07 |
| 2.22E+03 | 75.94 | 4.79E+03 | 61.28 | 2.99E+03 | 61.99 | 3.53E+03 | 79.33 | 2.80E+03 | 72.64 |
| 3.26E+03 | 74.33 | 6.48E+03 | 59.25 | 4.07E+03 | 60.73 | 5.30E+03 | 77.57 | 4.03E+03 | 71.36 |
| 4.75E+03 | 72.87 | 8.69E+03 | 57.61 | 5.53E+03 | 59.63 | 7.89E+03 | 75.54 | 5.78E+03 | 70.27 |
| 6.88E+03 | 71.44 | 1.16E+04 | 56.33 | 7.49E+03 | 58.65 | 1.16E+04 | 73.31 | 8.28E+03 | 69.16 |
| 9.90E+03 | 69.97 | 1.53E+04 | 55.42 | 1.01E+04 | 57.57 | 1.69E+04 | 70.80 | 1.18E+04 | 67.93 |
| 1.41E+04 | 68.40 | 2.01E+04 | 54.80 | 1.36E+04 | 56.30 | 2.42E+04 | 67.99 | 1.68E+04 | 66.49 |
| 2.02E+04 | 66.62 | 2.66E+04 | 54.34 | 1.81E+04 | 54.76 | 3.41E+04 | 65.02 | 2.36E+04 | 64.73 |
| 2.83E+04 | 64.56 | 3.52E+04 | 53.92 | 2.40E+04 | 52.91 | 4.74E+04 | 61.79 | 3.29E+04 | 62.64 |
| 3.94E+04 | 62.23 | 4.65E+04 | 53.39 | 3.15E+04 | 50.73 | 6.46E+04 | 58.40 | 4.54E+04 | 60.23 |
| 5.41E+04 | 59.64 | 6.13E+04 | 52.63 | 4.07E+04 | 48.27 | 8.66E+04 | 54.85 | 6.17E+04 | 57.52 |
| 7.26E+04 | 56.82 | 7.99E+04 | 51.58 | 5.19E+04 | 45.60 | 1.14E+05 | 51.20 | 8.18E+04 | 54.56 |
| 9.66E+04 | 53.83 | 1.04E+05 | 50.21 | 6.51E+04 | 42.82 | 1.46E+05 | 47.54 | 1.08E+05 | 51.45 |
| 1.26E+05 | 50.71 | 1.35E+05 | 48.51 | 8.03E+04 | 40.01 | 1.84E+05 | 43.89 | 1.39E+05 | 48.22 |
| 1.61E+05 | 47.48 | 1.72E+05 | 46.46 | 9.76E+04 | 37.25 | 2.28E+05 | 40.31 | 1.75E+05 | 44.92 |

TABLE 14

Melt strength data

| Sample | Melt Strength (cN) at 190° C. |
|---|---|
| IE. 1 | 5.8 |
| IE. 2 | 6.9 |
| IE. 3 | 5.2 |
| IE. 4 | 4.5 |
| IE. 5 | 4.0 |
| IE. 6 | 3.7 |
| IE. 7 | 4.3 |
| IE. 8 | 3.4 |
| CE. 1 | 5.6 |
| CE. 2 | 5.1 |

TABLE 15

GPC data by conventional GPC

| Sample | $M_w$ (g/mol) | $M_n$ (g/mol) | $M_w/M_n$ | $M_z$ (g/mol) |
|---|---|---|---|---|
| IE. 1 | 109,076 | 36,814 | 2.96 | 243,016 |
| IE. 2 | 118,832 | 41,510 | 2.86 | 269,937 |
| IE. 3 | 102,200 | 29,770 | 3.43 | 232,600 |
| IE. 4 | 100,600 | 39,880 | 2.52 | 201,100 |
| IE. 5 | 103,700 | 28,430 | 3.65 | 254,400 |
| IE. 6 | 102,500 | 36,170 | 2.83 | 210,800 |
| IE. 7 | 96,910 | 34,420 | 2.82 | 193,400 |
| IE. 8 | 95,730 | 10,760 | 8.90 | 317,000 |
| CE. 1 | 137,648 | 35,674 | 3.86 | 245,322 |
| CE. 2 | 111,668 | 29,795 | 3.75 | 333,492 |

TABLE 16

Weight average molecular weight Mw from conventional GPC, Zero shear viscosity ZSV, and ZSV Ratio.

| Sample | $M_w$ (g/mol) | ZSV (Pa-s) | Log ($M_w$ in g/mol) | Log (ZSV in Pa-s) | ZSV Ratio |
|---|---|---|---|---|---|
| IE. 1 | 109,076 | 35,900 | 5.038 | 4.555 | 6.42 |
| IE. 2 | 118,832 | 77,730 | 5.075 | 4.891 | 10.17 |
| IE. 3 | 102,200 | 41,806 | 5.002 | 4.621 | 10.08 |
| IE. 4 | 100,600 | 18,484 | 5.003 | 4.267 | 4.44 |
| IE. 5 | 103,700 | 13,889 | 5.016 | 4.143 | 2.99 |
| IE. 6 | 102,500 | 13,228 | 5.011 | 4.121 | 2.97 |
| IE. 7 | 96,910 | 46,871 | 4.986 | 4.671 | 12.91 |
| IE. 8 | 95,730 | 34,584 | 4.981 | 4.539 | 9.96 |
| CE. 1 | 137,648 | 17,762 | 5.139 | 4.249 | 1.36 |
| CE. 2 | 111,668 | 18,399 | 5.048 | 4.265 | 3.02 |

TABLE 17

Unsaturation data of Examples and Comparative Examples.

| | Unsaturation Unit/1,000,000 C | | | | |
|---|---|---|---|---|---|
| Sample | Vinylene | Trisubstituted | Vinyl | Vinylidene | Total Unsaturation/1,000,000 C |
| IE. 1 | 9 | 6 | 51 | 6 | 72 |
| IE. 2 | 5 | 1 | 54 | 5 | 66 |
| IE. 3 | 10 | 0 | 68 | 4 | 82 |
| IE. 4 | 8 | 3 | 56 | 12 | 79 |
| IE. 5 | 8 | 2 | 48 | 9 | 67 |
| IE. 6 | 11 | 3 | 62 | 8 | 84 |
| IE. 7 | 5 | 1 | 59 | 6 | 70 |
| IE. 8 | 26 | 18 | 45 | 14 | 103 |
| CE. 1 | 35 | 46 | 179 | 20 | 280 |
| CE. 2 | 39 | 47 | 179 | 20 | 285 |

TABLE 18

Summary of CEF data of Examples and Comparative Examples.

| Sample | Comonomer Dist. Index | Stdev (° C.) | HalfWidth (° C.) | HalfWidth/Stdev | CDC(Comonomer Dist. Constant) |
|---|---|---|---|---|---|
| IE. 1 | 0.5617 | 8.191 | 3.057 | 0.373 | 150.5 |
| IE. 2 | 0.6329 | 7.228 | 2.913 | 0.403 | 157.0 |
| IE. 3 | 0.6490 | 5.957 | 3.261 | 0.547 | 118.6 |
| IE. 4 | 0.5482 | 15.052 | 6.197 | 0.412 | 133.2 |
| IE. 5 | 0.3380 | 15.327 | 6.420 | 0.419 | 80.7 |
| IE. 6 | 0.5698 | 10.725 | 3.211 | 0.299 | 190.3 |
| IE. 7 | 0.8517 | 2.592 | 2.761 | 1.065 | 80.0 |
| IE. 8 | 0.5712 | 16.598 | 8.305 | 0.500 | 114.2 |
| CE. 1 | 0.1989 | 18.289 | 4.902 | 0.268 | 74.2 |
| CE. 2 | 0.1960 | 18.039 | 4.887 | 0.271 | 72.4 |

TABLE 19

MW Ratio of Examples 1-5.

| | Fraction | 1 | 2 | 3 | 4 | 5 | 6 | 7 | 8 | 9 |
|---|---|---|---|---|---|---|---|---|---|---|
| | Temp (° C.) | 30 | 35 | 40 | 45 | 50 | 55 | 60 | 65 | 70 |
| IE. 1 | Wt % (Temp) | 0.0% | 0.0% | 0.0% | 0.0% | 0.0% | 0.0% | 0.5% | 0.8% | 2.0% |
| | Cum. wt. frac. | 0.00 | 0.00 | 0.00 | 0.00 | 0.00 | 0.00 | 0.00 | 0.01 | 0.03 |
| | MW Ratio | | | | | | | | | 0.07 |
| IE. 2 | Wt % (Temp) | 0.0% | 0.1% | 0.0% | 0.1% | 0.1% | 0.1% | 0.2% | 0.4% | 0.9% |
| | Cum. wt. frac. | 0.00 | 0.00 | 0.00 | 0.00 | 0.00 | 0.00 | 0.01 | 0.01 | 0.02 |
| | MW Ratio | | | | | | | | | |
| IE. 3 | Wt % (Temp) | 0.0% | 0.0% | 0.0% | 0.0% | 0.0% | 0.0% | 0.3% | 0.4% | 0.5% |
| | Cum. wt. frac. | 0.00 | 0.00 | 0.00 | 0.00 | 0.00 | 0.00 | 0.00 | 0.01 | 0.01 |
| | MW Ratio | | | | | | | | | |
| IE. 4 | Wt % (Temp) | 0.3% | 0.1% | 0.3% | 0.5% | 1.0% | 1.9% | 3.5% | 6.4% | 11.0% |
| | Cum. wt. frac. | 0.00 | 0.00 | 0.007 | 0.013 | 0.02 | 0.04 | 0.08 | 0.14 | 0.25 |
| | MW Ratio | | | | | | 0.10 | 0.14 | 0.19 | 0.25 |
| IE. 5 | Wt % (Temp) | 0.2% | 0.2% | 0.3% | 0.4% | 0.8% | 1.4% | 2.4% | 4.1% | 7.1% |
| | Cum. wt. frac. | 0.00 | 0.00 | 0.01 | 0.0120 | 0.02 | 0.03 | 0.06 | 0.10 | 0.17 |
| | MW Ratio | | | | | | 0.04 | 0.05 | 0.07 | 0.10 |

| | Fraction | 10 | 11 | 12 | 13 | 14 | 15 | 16 |
|---|---|---|---|---|---|---|---|---|
| | Temp (° C.) | 75 | 80 | 85 | 90 | 95 | 100 | 105 |
| IE. 1 | Wt % (Temp) | 4.3% | 10.5% | 17.6% | 14.1% | 48.2% | 2.1% | 0.0% |
| | Cum. wt. frac. | 0.08 | 0.18 | 0.36 | 0.50 | 0.98 | 1.00 | 1.00 |
| | MW Ratio | 0.08 | 0.14 | 0.21 | 0.34 | 0.56 | 1.00 | |
| IE. 2 | Wt % (Temp) | 2.3% | 6.9% | 15.8% | 16.3% | 48.4% | 8.4% | 0.0% |
| | Cum. wt. frac. | 0.04 | 0.11 | 0.27 | 0.43 | 0.92 | 1.00 | 1.00 |
| | MW Ratio | 0.06 | 0.12 | 0.20 | 0.32 | 0.59 | 1.00 | |
| IE. 3 | Wt % (Temp) | 1.1% | 2.6% | 6.4% | 9.2% | 73.7% | 5.4% | |
| | Cum. wt. frac. | 0.02 | 0.05 | 0.11 | 0.20 | 0.94 | 1.00 | |
| | MW Ratio | 0.04 | 0.06 | 0.09 | 0.19 | 0.60 | 1.00 | |
| IE. 4 | Wt % (Temp) | 17.0% | 9.3% | 3.4% | 42.6% | 2.6% | 0.0% | |
| | Cum. wt. frac. | 0.42 | 0.51 | 0.55 | 0.97 | 1.00 | 1.00 | |
| | MW Ratio | 0.28 | 0.35 | 0.43 | 0.69 | 1.00 | | |
| IE. 5 | Wt % (Temp) | 12.3% | 15.8% | 6.5% | 8.5% | 34.1% | 6.0% | 0.0% |
| | Cum. wt. frac. | 0.29 | 0.45 | 0.51 | 0.60 | 0.94 | 1.00 | 1.00 |
| | MW Ratio | 0.13 | 0.17 | 0.20 | 0.59 | 0.65 | 1.00 | |

TABLE 20

MW Ratio of Examples 6-8 and Comparative Examples 1-2.

| | Fraction | 1 | 2 | 3 | 4 | 5 | 6 | 7 | 8 | 9 |
|---|---|---|---|---|---|---|---|---|---|---|
| | Temp (° C.) | 30 | 35 | 40 | 45 | 50 | 55 | 60 | 65 | 70 |
| IE. 6 | Wt % (Temp) | 0.1% | 0.0% | 0.1% | 0.1% | 0.2% | 0.3% | 0.5% | 1.2% | 2.7% |
| | Cum. wt. frac. | 0.00 | 0.00 | 0.00 | 0.00 | 0.00 | 0.01 | 0.01 | 0.02 | 0.05 |
| | MW Ratio | | | | | | | | | 0.08 |
| IE. 7 | Wt % (Temp) | 0.0% | 0.0% | 0.0% | 0.0% | 0.0% | 0.1% | 0.0% | 0.1% | 0.2% |
| | Cum. wt. frac. | 0.00 | 0.00 | 0.00 | 0.00 | 0.00 | 0.00 | 0.00 | 0.00 | 0.00 |
| | MW Ratio | | | | | | | | | |
| IE. 8 | Wt % (Temp) | 2.7% | 0.5% | 0.8% | 1.1% | 1.7% | 2.5% | 3.9% | 6.2% | 9.7% |
| | Cum. wt. frac. | 0.03 | 0.03 | 0.04 | 0.05 | 0.07 | 0.09 | 0.13 | 0.19 | 0.29 |
| | MW Ratio | 0.01 | | | 0.02 | 0.03 | 0.03 | 0.04 | 0.05 | 0.06 |
| CE1 | Wt % (Temp) | 6.7% | 0.9% | 1.3% | 2.2% | 3.5% | 4.5% | 6.2% | 7.8% | 10.2% |
| | Cum. wt. frac. | 0.07 | 0.08 | 0.09 | 0.11 | 0.15 | 0.19 | 0.25 | 0.33 | 0.43 |
| | MW Ratio | 0.23 | | 0.13 | 0.20 | 0.25 | 0.31 | 0.37 | 0.41 | 0.46 |
| CE2 | Wt % (Temp) | 2.1% | 0.2% | 0.4% | 0.8% | 0.5% | 0.8% | 1.2% | 2.9% | 10.1% |
| | Cum. wt. frac. | 0.02 | 0.02 | 0.03 | 0.03 | 0.04 | 0.05 | 0.06 | 0.09 | 0.19 |
| | MW Ratio | 0.91 | | | | | | 0.23 | 0.43 | 0.88 |

| | Fraction | 10 | 11 | 12 | 13 | 14 | 15 | 16 |
|---|---|---|---|---|---|---|---|---|
| | Temp (° C.) | 75 | 80 | 85 | 90 | 95 | 100 | 105 |
| IE. 6 | Wt % (Temp) | 6.6% | 15.7% | 17.6% | 11.7% | 41.2% | 2.0% | 0.0% |
| | Cum. wt. frac. | 0.12 | 0.27 | 0.45 | 0.57 | 0.98 | 1.00 | 1.00 |
| | MW Ratio | 0.12 | 0.20 | 0.25 | 0.54 | 0.64 | 1.00 | |
| IE. 7 | Wt % (Temp) | 0.3% | 0.5% | 1.2% | 3.8% | 78.4% | 15.2% | 0.2% |
| | Cum. wt. frac. | 0.01 | 0.01 | 0.02 | 0.06 | 0.85 | 1.00 | 1.00 |
| | MW Ratio | | | 0.08 | 0.21 | 0.72 | 1.00 | |
| IE. 8 | Wt % (Temp) | 13.8% | 9.7% | 4.8% | 40.2% | 2.3% | 0.1% | 0.0% |
| | Cum. wt. frac. | 0.43 | 0.53 | 0.57 | 0.98 | 1.00 | 1.00 | 1.00 |
| | MW Ratio | 0.09 | 0.13 | 0.28 | 0.69 | 1.00 | | |
| CE1 | Wt % (Temp) | 11.8% | 12.3% | 9.6% | 5.3% | 10.3% | 7.2% | 0.3% |
| | Cum. wt. frac. | 0.55 | 0.67 | 0.77 | 0.82 | 0.92 | 1.00 | 1.00 |
| | MW Ratio | 0.53 | 0.50 | 0.65 | 0.62 | 0.72 | 1.00 | |
| CE2 | Wt % (Temp) | 22.0% | 7.4% | 5.2% | 6.1% | 20.2% | 17.6% | 2.6% |
| | Cum. wt. frac. | 0.41 | 0.48 | 0.54 | 0.60 | 0.80 | 0.97 | 1.00 |
| | MW Ratio | 1.24 | 1.08 | 0.31 | 0.31 | 0.55 | 0.75 | 1.00 |

TABLE 21

Blown film process parameters used to produce all films.

| Parameter | Condition Set 1 | Condition Set 2 | Condition Set 3 | LLDPE 0.5 MI | LLDPE 0.85 MI |
|---|---|---|---|---|---|
| Blow up ratio (BUR) | 2.5 | 2.5 | 2.5 | 2.5 | 2.5 |
| Output (lb/hr) | 150 | 150 | 150 | 150 | 150 |
| Film Thickness (mil) | 2 | 2 | 2 | 2 | 2 |
| Die Gap (mil) | 70 | 70 | 70 | 70 | 70 |
| Layflat (in) | 23.5 | 23.5 | 23.5 | 23.5 | 23.5 |
| Air Temperature (° F.) | 45 | 45 | 45 | 45 | 45 |
| Temperature Profile (° F.) | | | | | |
| Barrel 1 | 375 | 375 | 375 | 375 | 375 |
| Barrel 2 | 425 | 425 | 425 | 425 | 420 |
| Barrel 3 | 420 | 350 | 420 | 410 | 370 |
| Barrel 4 | 420 | 350 | 420 | 400 | 340 |
| Barrel 5 | 420 | 350 | 420 | 400 | 310 |
| Screen | 440 | 450 | 440 | 450 | 460 |
| Adapter | 440 | 450 | 440 | 450 | 460 |
| Rotator | 440 | 450 | 440 | 450 | 460 |
| Lower Die | 450 | 450 | 450 | 450 | 460 |
| Upper Die | 450 | 450 | 450 | 450 | 460 |

TABLE 22

Film properties of LLDPE-rich film Set 1 (65% LLDPE/35% LDPE) excluding tensile properties.

| Sample | MD Shrink Tension (Psi) | CD Shrink Tension (Psi) | MD Free Shrink 150° C. | CD Free Shrink 150° C. | Haze Total (%) | Haze Internal (%) | Gloss 45 Degree (%) | Clarity (%) | Puncture (ft-lb/in$^3$) | Dart A (g) | MD Tear (g) | CD Tear (g) | $I_2$ (190° C.) | $I_{10}/I_2$ (190° C.) | Density (g/cm$^3$) |
|---|---|---|---|---|---|---|---|---|---|---|---|---|---|---|---|
| Inventive Blend 3 | 18.9 | 1.3 | 78.3 | 17.3 | 14.5 | 3.9 | 56 | 94 | 87 | 112 | 76 | 749 | 0.34 | 12.7 | 0.9316 |
| Inventive Blend 4 | 21.1 | 0.8 | 79.3 | 19.3 | 13.9 | 2.8 | 54 | 91 | 81 | 154 | 110 | 918 | 0.50 | 13.9 | 0.9244 |
| Inventive Blend 5 | 21.7 | 0.7 | 79.3 | 12.4 | 10.9 | 2.3 | 64 | 93 | 124 | 346 | 113 | 1,001 | 0.50 | 10.7 | 0.9242 |
| Inventive Blend 6 | 15.7 | 0.8 | 77.4 | 14.4 | 10.9 | 2.9 | 63 | 94 | 126 | 178 | 118 | 927 | 0.49 | 10.2 | 0.9251 |

TABLE 22-continued

Film properties of LLDPE-rich film Set 1 (65% LLDPE/35% LDPE) excluding tensile properties.

| Sample | MD Shrink Tension (Psi) | CD Shrink Tension (Psi) | MD Free Shrink 150° C. | CD Free Shrink 150° C. | Haze Total (%) | Haze Internal (%) | Gloss 45 Degree (%) | Clarity (%) | Puncture (ft-lb/in³) | Dart A (g) | MD Tear (g) | CD Tear (g) | $I_2$ (190° C.) | $I_{10}/I_2$ (190° C.) | Density (g/cm³) |
|---|---|---|---|---|---|---|---|---|---|---|---|---|---|---|---|
| Inventive Blend 7 | 15.1 | 1.0 | 76.4 | 21.3 | 15.6 | 5.4 | 56 | 95 | 76 | 112 | 131 | 726 | 0.35 | 13.4 | 0.9328 |
| Inventive Blend 8 | 16.7 | 1.0 | 78.3 | 20.3 | 10.9 | 1.8 | 62 | 94 | 202 | 157 | 186 | 1,072 | 0.45 | 11.3 | 0.9202 |
| Comparative blend 1 | 26.2 | 0.8 | 77.4 | 10.4 | 9.2 | 2.9 | 75 | 91 | 88 | 265 | 173 | 1,490 | 0.32 | 9.8 | 0.9265 |
| Comparative blend 2 | 18.3 | 0.2 | 78.3 | 16.3 | 12.0 | 2.8 | 61 | 93 | 150 | 301 | 176 | 1,337 | 0.45 | 10.6 | 0.9243 |

TABLE 23

Film properties of LLDPE-rich film Set 1 (65% LLDPE/35% LDPE): tensile properties.

| Sample | 2% Secant Modulus MD (Psi) | 2% Secant Modulus CD (Psi) | Break Stress MD (Psi) | Break Stress CD (Psi) | Strain at Break MD (%) | Strain at Break CD (%) | Strain at Yield MD (%) | Strain at Yield CD (%) | Stress at Yield MD (Psi) | Stress at Yield CD (Psi) |
|---|---|---|---|---|---|---|---|---|---|---|
| Inventive Blend 3 | 51,731 | 63,048 | 5,385 | 5,022 | 592 | 849 | 103 | 11 | 3,227 | 2,595 |
| Inventive Blend 4 | 30,507 | 36,500 | 4,282 | 4,587 | 416 | 763 | 25 | 14 | 2,253 | 2,211 |
| Inventive Blend 5 | 32,111 | 36,964 | 4,721 | 3,486 | 531 | 661 | 90 | 11 | 3,044 | 1,947 |
| Inventive Blend 6 | 33,844 | 39,572 | 4,036 | 2,335 | 429 | 503 | 37 | 58 | 2,099 | 1,714 |
| Inventive Blend 7 | 52,074 | 63,114 | 4,985 | 4,901 | 571 | 822 | 125 | 12 | 3,012 | 2,633 |
| Inventive Blend 8 | 25,857 | 28,979 | 4,800 | 4,062 | 484 | 618 | 99 | 13 | 2,759 | 1,665 |
| Comparative blend 1 | 40,344 | 47,793 | 5,002 | 4,585 | 496 | 666 | 86 | 14 | 3,048 | 1,908 |
| Comparative blend 2 | 36,319 | 43,677 | 4,480 | 3,834 | 501 | 612 | 120 | 21 | 2,642 | 1,825 |

TABLE 24

Film properties of LLDPE-rich film Set 2 (65% LLDPE/35% LDPE) excluding tensile properties.

| Sample | MD Shrink Tension (Psi) | CD Shrink Tension (Psi) | MD Free Shrink 150° C. | CD Free Shrink 150° C. | Haze Total (%) | Haze Internal (%) | Gloss 45 Degree (%) | Clarity (%) | Puncture (ft-lb/in³) | Dart A (g) | MD Tear (g) | CD Tear (g) | $I_2$ (190° C.) | $I_{10}/I_2$ (190° C.) | Density (g/cm³) |
|---|---|---|---|---|---|---|---|---|---|---|---|---|---|---|---|
| Inventive Blend 1 | 22.8 | 0.9 | 80.3 | 20.3 | 12.5 | 3.1 | 50 | 94 | 128 | 145 | 94 | 989 | 0.33 | 11.6 | 0.9263 |
| Inventive Blend 2 | 24.7 | 1.3 | 81.3 | 21.3 | 13.0 | 2.4 | 47 | 77 | 128 | 169 | 89 | 976 | 0.23 | 12.6 | 0.9263 |
| Comparative blend 3 | 29.5 | 0.6 | 80.3 | 8.5 | 9.9 | 2.5 | 60 | 89 | 83 | 310 | 163 | 1,462 | 0.33 | 9.6 | 0.9256 |
| Comparative blend 4 | 14.2 | 0.7 | 78.3 | 18.3 | 11.4 | 3.1 | 57 | 94 | 155 | 310 | 218 | 1,329 | 0.55 | 10.4 | 0.9249 |

TABLE 25

Film properties of LLDPE-rich film Set 2 (65% LLDPE/35% LDPE): tensile properties.

| Sample | 2% Secant Modulus MD (Psi) | 2% Secant Modulus CD (Psi) | Break Stress MD (Psi) | Break Stress CD (Psi) | Strain at Break MD (%) | Strain at Break CD (%) | Strain at Yield MD (%) | Strain at Yield CD (%) | Stress at Yield MD (Psi) | Stress at Yield CD (Psi) |
|---|---|---|---|---|---|---|---|---|---|---|
| Inventive Blend 1 | 35,963 | 42,716 | 5,908 | 5,292 | 593 | 837 | 14 | 13 | 2,181 | 2,148 |
| Inventive Blend 2 | 35,921 | 42,147 | 6,150 | 4,806 | 541 | 762 | 15 | 30 | 2,219 | 2,137 |
| Comparative blend 3 | 34,146 | 40,191 | 5,163 | 4,197 | 474 | 754 | 16 | 13 | 2,070 | 1,574 |
| Comparative blend 4 | 34,232 | 42,470 | 5,046 | 5,105 | 515 | 731 | 13 | 11 | 1,860 | 1,940 |

TABLE 26

Film properties of LDPE-rich films (80% LDPE/20% LLDPE) excluding tensile properties.

| Example | MD Shrink Tension (Psi) | CD Shrink Tension (Psi) | MD % Free Shrink (150° C.) | CD % Free Shrink (150° C.) | Haze Total (%) | Haze Internal (%) | Gloss 45 Degree (%) | Clarity (%) | Puncture (ft-lb/in³) | Dart A (g) | MD Tear (g) | CD Tear (g) | $I_2$ (190° C.) | $I_{10}/I_2$ (190° C.) | Density (g/cm³) |
|---|---|---|---|---|---|---|---|---|---|---|---|---|---|---|---|
| Inventive Blend 9 | 32.1 | 0.8 | 83.3 | 23.2 | 12.4 | 1.8 | 47.6 | 86.5 | 71 | 172 | 212 | 339 | 0.23 | 16.4 | 0.9228 |
| Inventive Blend 10 | 34.4 | 0.7 | 83.3 | 23.2 | 12.6 | 1.9 | 46.6 | 86.9 | 80 | 169 | 206 | 387 | 0.22 | 16.0 | 0.9227 |
| Inventive Blend 11 | 31.9 | 0.8 | 80.3 | 25.2 | 10.9 | 2.2 | 64.0 | 91.8 | 65 | 130 | 246 | 310 | 0.18 | 18.5 | 0.9251 |
| Inventive Blend 12 | 33.4 | 1.4 | 80.3 | 26.2 | 10.6 | 1.4 | 63.4 | 91.0 | 94 | 238 | 153 | 394 | 0.24 | 16.8 | 0.9215 |
| Inventive Blend 13 | 30.7 | 1.0 | 80.3 | 26.2 | 11.0 | 1.5 | 63.4 | 89.5 | 86 | 157 | 193 | 311 | 0.26 | 16.5 | 0.9225 |
| Inventive Blend 14 | 32.1 | 0.8 | 82.3 | 25.2 | 10.6 | 1.7 | 65.0 | 91.4 | 86 | 190 | 174 | 331 | 0.26 | 16.8 | 0.9232 |
| Inventive Blend 15 | 25.6 | 0.9 | 78.3 | 29.1 | 12.1 | 2.4 | 60.4 | 91.3 | 70 | 124 | 251 | 327 | 0.22 | 17.7 | 0.9248 |
| Inventive Blend 16 | 28.5 | 1.2 | 81.3 | 26.2 | 11.0 | 1.5 | 62.8 | 90.6 | 80 | 148 | 179 | 314 | 0.30 | 17.3 | 0.9226 |
| Comparative Blend 5 | 37.0 | 0.7 | 82.3 | 23.2 | 12.4 | 1.2 | 45.9 | 83.3 | 52 | 250 | 142 | 360 | 0.22 | 14.6 | 0.9230 |
| Comparative Blend 6 | 27.8 | 0.4 | 81.3 | 24.2 | 10.6 | 1.6 | 52.3 | 90.0 | 92 | 160 | 197 | 439 | 0.29 | 16.8 | 0.9234 |

TABLE 27

Film properties of LDPE-rich films (80% LDPE/20% LLDPE): tensile properties.

| Example | 2% Secant Modulus MD (Psi) | 2% Secant Modulus CD (Psi) | Break Stress MD (Psi) | Break Stress CD (Psi) | Strain at Break MD (%) | Strain at Break CD (%) | Strain at Yield MD (%) | Strain at Yield CD (%) | Stress at Yield MD (Psi) | Stress at Yield CD (Psi) |
|---|---|---|---|---|---|---|---|---|---|---|
| Inventive Blend 9 | 29,900 | 35,489 | 4,354 | 4,214 | 321 | 711 | 14 | 13 | 1,743 | 1,874 |
| Inventive Blend 10 | 26,016 | 34,923 | 4,222 | 3,991 | 294 | 720 | 13 | 13 | 1,742 | 1,782 |
| Inventive Blend 11 | 37,253 | 42,344 | 4,251 | 3,480 | 289 | 653 | 93 | 26 | 3,519 | 1,852 |
| Inventive Blend 12 | 32,372 | 36,897 | 4,665 | 3,852 | 387 | 639 | 113 | 12 | 3,347 | 1,591 |
| Inventive Blend 13 | 34,594 | 38,215 | 4,380 | 3,532 | 318 | 625 | 57 | 19 | 2,949 | 1,694 |
| Inventive Blend 14 | 35,086 | 39,124 | 4,025 | 3,620 | 299 | 637 | 57 | 15 | 2,802 | 1,710 |
| Inventive Blend 15 | 37,170 | 43,450 | 4,086 | 3,698 | 335 | 643 | 103 | 14 | 3,186 | 1,892 |
| Inventive Blend 16 | 33,656 | 37,261 | 3,626 | 3,427 | 243 | 634 | 75 | 13 | 2,803 | 1,666 |
| Comparative Blend 5 | 28,502 | 35,793 | 4,136 | 3,277 | 242 | 631 | 13 | 28 | 1,705 | 1,692 |
| Comparative Blend 6 | 28,037 | 34,739 | 2,419 | 4,483 | 276 | 706 | 22 | 14 | 1,069 | 2,002 |

TABLE 28

Film properties of 100% LLDPE films excluding tensile properties.

| | MD Shrink Tension (Psi) | CD Shrink Tension (Psi) | MD Free Shrink 150 C. | CD Free Shrink 150 C. | Haze Total (%) | Haze Internal (%) | Gloss 45 Degree (%) | Clarity (%) | Puncture (ft-lb/in³) | Dart A (g) | MD Tear (g) | CD Tear (g) | $I_2$ (190° C.) | $I_{10}/I_2$ (190° C.) | Density (g/cm³) |
|---|---|---|---|---|---|---|---|---|---|---|---|---|---|---|---|
| Inventive Film 1 | 4.4 | 0.8 | 66.5 | 18.3 | 11.5 | 4.4 | 59 | 99 | 168 | 190 | 424 | 995 | 0.47 | 9.5 | 0.9283 |
| Inventive Film 2 | 6.1 | 1.1 | 73.4 | 19.3 | 13.8 | 4.3 | 49 | 99 | 182 | 280 | 388 | 1,128 | 0.33 | 10.4 | 0.9275 |
| Inventive Film 3 | 5.6 | 0.7 | 70.5 | 3.5 | 16.2 | 6.8 | 59 | 99 | 101 | 130 | 71 | 802 | 0.53 | 10.8 | 0.9355 |
| Inventive Film 4 | 5.4 | 0.4 | 69.5 | −3.3 | 9.3 | 4.3 | 78 | 99 | 304 | 496 | 631 | 1,188 | 0.76 | 8.4 | 0.9190 |
| Inventive Film 5 | 5.4 | 0.2 | 67.5 | −3.3 | 19.2 | 7.7 | 53 | 97 | 149 | 127 | 427 | 1,248 | 0.89 | 8.4 | 0.9256 |
| Inventive Film 6 | 5.2 | 0.4 | 67.5 | −8.3 | 22.1 | 7.5 | 50 | 96 | 170 | 226 | 415 | 1,045 | 0.90 | 8.0 | 0.9264 |
| Inventive Film 7 | 5.7 | 0.9 | 74.4 | 11.4 | 16.8 | 7.5 | 63 | 99 | 99 | 139 | 64 | 609 | 0.59 | 11.3 | 0.9372 |
| Inventive Film 8 | 6.3 | 0.5 | 76.4 | 6.5 | 13.2 | 5.2 | 65 | 98 | 124 | 112 | 227 | 1,525 | 1.00 | 13.4 | 0.9266 |
| Comparative Film 1 | 3.7 | 0.3 | 55.7 | 1.6 | 9.5 | 4.5 | 74 | 90 | 99 | 379 | 614 | 1,053 | 0.52 | 7.4 | 0.9278 |
| Comparative Film 2 | 3.9 | 0.5 | 73.4 | 0.6 | 14.8 | 6.7 | 56 | 99 | 207 | 598 | 541 | 1,050 | 0.94 | 7.9 | 0.9256 |

TABLE 29

Film properties of 100% LLDPE films: tensile properties.

| | 2% Secant Modulus MD (Psi) | 2% Secant Modulus CD (Psi) | Break Stress MD (Psi) | Break Stress CD (Psi) | Strain at Break MD (%) | Strain at Break CD (%) | Strain at Yield MD (%) | Strain at Yield CD (%) | Stress at Yield MD (Psi) | Stress at Yield CD (Psi) |
|---|---|---|---|---|---|---|---|---|---|---|
| Inventive Film 1 | 42,202 | 40,752 | 18,889 | 3,174 | 734 | 696 | 31 | 50 | 7,058 | 1,578 |
| Inventive Film 2 | 38,209 | 39,996 | 4,236 | 17,797 | 708 | 744 | 22 | 19 | 1,308 | 6,571 |
| Inventive Film 3 | 59,224 | 67,810 | 6,900 | 2,543 | 747 | 909 | 15 | 13 | 2,543 | 2,699 |
| Inventive Film 4 | 23,684 | 25,874 | 6,965 | 1,695 | 653 | 773 | 93 | 20 | 1,695 | 1,456 |
| Inventive Film 5 | 33,843 | 36,243 | 5,150 | 1,848 | 664 | 860 | 63 | 18 | 1,848 | 1,826 |
| Inventive Film 6 | 35,951 | 40,700 | 5,883 | 1,953 | 658 | 720 | 32 | 45 | 1,953 | 1,898 |
| Inventive Film 7 | 60,601 | 67,561 | 3,527 | 3,445 | 215 | 718 | 90 | 39 | 3,445 | 2,432 |
| Inventive Film 8 | 34,344 | 37,956 | 4,254 | 1,849 | 637 | 792 | 19 | 14 | 1,849 | 2,024 |
| Comparative Film 1 | 37,210 | 44,259 | 2,438 | 4,528 | 604 | 649 | 30 | 37 | 905 | 2,399 |
| Comparative Film 2 | 33,493 | 39,329 | 6,544 | 6,246 | 656 | 726 | 23 | 15 | 1,894 | 2,133 |

Test Methods

Density

Samples that are measured for density are prepared according to ASTM D 1928. Measurements are made within one hour of sample pressing using ASTM D792, Method B.

Melt Index

Melt index, MI or $I_2$, is measured in accordance with ASTM D 1238, Condition 190° C./2.16 kg, and is reported in grams eluted per 10 minutes. $I_{10}$ is measured in accordance with ASTM D 1238, Condition 190° C./10 kg, and is reported in grams eluted per 10 minutes.

DSC Crystallinity

Differential Scanning Calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40°

C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for polyethylene samples using Equation 6.

The heat of fusion ($H_f$) and the peak melting temperature are reported from the second heat curve. Peak crystallization temperature is determined from the cooling curve.

Dynamic Mechanical Spectroscopy (DMS) Frequency Sweep

Melt rheology, constant temperature frequency sweeps, were performed using a TA Instruments Advanced Rheometric Expansion System (ARES) rheometer equipped with 25 mm parallel plates under a nitrogen purge. Frequency sweeps were performed at 190° C. for all samples at a gap of 2.0 mm and at a constant strain of 10%. The frequency interval was from 0.1 to 100 radians/second. The stress response was analyzed in terms of amplitude and phase, from which the storage modulus (G'), loss modulus (G"), and dynamic melt viscosity ($\eta^*$) were calculated.

CEF Method

Comonomer distribution analysis is performed with Crystallization Elution Fractionation (CEF) (PolymerChar in Spain) (B. Monrabal et al, Macromol. Symp. 257, 71-79 (2007)). Ortho-dichlorobenzene (ODCB) with 600 ppm antioxidant butylated hydroxytoluene (BHT) is used as the solvent. Sample preparation is done with autosampler at 160° C. for 2 hours under shaking at 4 mg/ml (unless otherwise specified). The injection volume is 300 µl. The temperature profile of the CEF is: crystallization at 3° C./min from 110° C. to 30° C., thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second.

The CEF column is packed by the Dow Chemical Company with glass beads at 125 um±6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. The temperature is calibrated by adjusting the elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %. The CEF column resolution is defined in Equation 7, where the column resolution is 6.0.

CDC Method

Comonomer distribution constant (CDC) is calculated from comonomer distribution profile by CEF. CDC is defined as Comonomer Distribution Index divided by Comonomer Distribution Shape Factor multiplying by 100 as shown in Equation 1.

Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated from comonomer distribution profile by CEF, and CDC is defined as Comonomer Distribution Index divided by Comonomer Distribution Shape Factor multiplying by 100 as shown in Equation 1, and wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature (Tp).

CDC is calculated according to the following steps:

(A) Obtain a weight fraction at each temperature (T)($w_T$ (T)) from 35.0° C. to 119.0° C. with a temperature step increase of 0.200° C. from CEF according to Equation 2;

(B) Calculate the median temperature ($T_{median}$) at cumulative weight fraction of 0.500, according to Equation 3;

(C) Calculate the corresponding median comonomer content in mole % ($C_{median}$) at the median temperature ($T_{median}$) by using comonomer content calibration curve according to Equation 4;

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average Mw of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; The calibration is calculated from each reference material as shown in Equation 4, wherein: $R^2$ is the correlation constant;

(F) Calculate Comonomer Distribution Index from the total weight fraction with a comonomer content ranging from $0.5^*C_{median}$ to $1.5^*C_{median}$, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak;

(H) Calculate the standard deviation of temperature (Stdev) according Equation 5.

Conventional GPC $M_{w\text{-}gpc}$ Determination

To obtain Mw-gpc values, the chromatographic system consist of either a Polymer Laboratories Model PL-210 or a Polymer Laboratories Model PL-220 equipped with a refractive index (RI) concentration detector. The column and carousel compartments are operated at 140° C. Three Polymer Laboratories 10-μm Mixed-B columns are used with a solvent of 1,2,4-trichlorobenzene. The samples are prepared at a concentration of 0.1 g of polymer in 50 mL of solvent. The solvent used to prepare the samples contain 200 ppm of the antioxidant butylated hydroxytoluene (BHT). Samples are prepared by agitating lightly for 4 hours at 160° C. The injection volume used is 100 microliters and the flow rate is 1.0 mL/min. Calibration of the GPC column set is performed with twenty one narrow molecular weight distribution polystyrene standards purchased from Polymer Laboratories. The polystyrene standard peak molecular weights are converted to polyethylene molecular weights shown in the Equation 12, where M is the molecular weight, A has a value of 0.4316 and B is equal to 1.0.

A third order polynomial is determined to build the logarithmic molecular weight calibration as a function of elution volume. The weight-average molecular weight by the above conventional calibration is defined as $Mw_{cc}$, in the equation shown in Equation 13. Where, the summation is across the GPC elution curve, with RI and $M_{cc}$ represents the RI detector signal and conventional calibration molecular weight at each GPC elution slice. Polyethylene equivalent molecular weight calculations are performed using Viscotek TriSEC software Version 3.0. The precision of the weight-average molecular weight ΔMw is excellent at <2.6%.

Creep Zero Shear Viscosity Measurement Method:

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log(J(t)) vs. log (t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ϵ vs. t, where ϵ is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-shear viscosity ratio (ZSVR) is defined as the ratio of the zero-shear viscosity (ZSV) of the branched polyethylene material to the ZSV of the linear polyethylene material at the equivalent weight average molecular weight (Mw-gpc) as shown in the Equation 8.

The ZSV value is obtained from creep test at 190° C. via the method described above. The Mw-gpc value is determined by the conventional GPC method as described above. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

Melt Strength

Melt strength is measured at 190° C. using a Göettfert Rheotens 71.97 (Göettfert Inc.; Rock Hill, S.C.), melt fed with a Göettfert Rheotester 2000 capillary rheometer equipped with a flat entrance angle (180 degrees) of length of 30 mm and diameter of 2 mm. The pellets are fed into the barrel (L=300 mm, Diameter=12 mm), compressed and allowed to melt for 10 minutes before being extruded at a constant piston speed of 0.265 mm/s, which corresponds to a wall shear rate of 38.2s$^{-1}$ at the given die diameter. The extrudate passes through the wheels of the Rheotens located at 100 mm below the die exit and is pulled by the wheels downward at an acceleration rate of 2.4 mm/s$^2$. The force (in cN) exerted on the wheels is recorded as a function of the velocity of the wheels (in mm/s). Melt strength is reported as the plateau force (cN) before the strand broke.

$^1$H NMR Method 3.26 g of stock solution is added to 0.133 g of polyolefin sample in 10 mm NMR tube. The stock solution is a mixture of tetrachloroethane-d$_2$ (TCE) and perchloroethylene (50:50, w:w) with 0.001M Cr$^{3+}$. The solution in the tube is purged with N$_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The $^1$H NMR are run with a 10 mm cryoprobe at 120° C. on Bruker AVANCE 400 MHz spectrometer.

Two experiments are run to get the unsaturation: the control and the double presaturation experiments.

For the control experiment, the data is processed with exponential window function with LB=1 Hz, baseline was corrected from 7 to −2 ppm. The signal from residual $^1$H of TCE is set to 100, the integral $I_{total}$ from −0.5 to 3 ppm is used as the signal from whole polymer in the control experiment. The number of CH$_2$ group, NCH$_2$, in the polymer is calculated as following:

$$NCH_2 = I_{total}/2$$

For the double presaturation experiment, the data is processed with exponential window function with LB=1 Hz, baseline was corrected from 6.6 to 4.5 ppm. The signal from residual $_1$H of TCE is set to 100, the corresponding integrals for unsaturations ($I_{vinylene}$, $I_{trisubstituted}$, $I_{vinyl}$ and $I_{vinylidene}$) were integrated based on the region shown in FIG. 1. The number of unsaturation unit for vinylene, trisubstituted, vinyl and vinylidene are calculated:

$N_{vinylene} = I_{vinylene}/2$ $N_{trisubstituted} = I_{trisubstituted}$ $N_{vinyl} = I_{vinyl}/2$ $N_{vinylidene} = I_{vinylidene}/2$ The unsaturation unit/1,000,000 carbons is calculated as following:

$N_{vinylene}/1{,}000{,}000C = (N_{vinylene}/NCH_2)*1{,}000{,}000$ $N_{trisubstituted}/1{,}000{,}000C = (N_{trisubstituted}/NCH_2)*1{,}000{,}000$ $N_{vinyl}/1{,}000{,}000C = (N_{vinyl}/NCH_2)*1{,}000{,}000$ $N_{vinylidene}/1{,}000{,}000C = (N_{vinylidene}/NCH_2)*1{,}000{,}000$ The requirement for unsaturation NMR analysis includes: level of quantitation is 0.47±0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation is defined as signal to noise ratio of 10.

The chemical shift reference is set at 6.0 ppm for the $^1H$ signal from residual proton from TCT-d2. The control is run with ZG pulse, TD 32768, NS 4, DS 12, SWH 10,000 Hz, AQ 1.64 s, D1 14 s. The double presaturation experiment is run with a modified pulse sequence, O1P1.354 ppm, O2P 0.960 ppm, PL9 57 db, PL21 70 db, TD 32768, NS 200, DS 4, SWH 10,000 Hz, AQ 1.64 s, D1 1 s, D13 13 s. The modified pulse sequences for unsaturation with Bruker AVANCE 400 MHz spectrometer are shown in FIG. 2.

TREF Column

The TREF columns are constructed from acetone-washed ⅛ inch×0.085 inch 316 stainless steel tubing. The tubing is cut to a length of 42 inches and packed with a dry mixture (60:40 volume:volume) of pacified 316 stainless steel cut wire of 0.028 inch diameter (Pellet Inc., North Tonawanda, N.Y.) and 30-40 mesh spherical technical grade glass beads. This combination of column length and packing material results in an interstitial volume of approximately 1.75 mL. The TREF column ends are capped with Valco microbore HPLC column end fittings equipped with a 10 μm stainless steel screen. These column ends provide the TREF columns with a direct connection to the plumbing of the cross fractionation instrument within the TREF oven. The TREF columns are coiled, outfitted with an resistance temperature detector (RTD) temperature sensor, and wrapped with glass insulation tape before installation. During installation, extra care is given to level placement of the TREF column with the oven to ensure adequate thermal uniformity within the column. Chilled air is provided at 40 L/min to the TREF ovens via a chiller whose bath temperature is 2° C.

TREF Column Temperature Calibration

The reported elution temperatures from the TREF column are adjusted with the heating rate used in the temperature range of 110° C. to 30° C. such that the observed compositions versus elution temperatures agree with those previously reported (L. Wild, R. T. Ryle et al., J. Polymer Science Polymer Physics Edition 20, 441-455 (1982)).

Sample Preparation

The sample solutions are prepared as 4 mg/mL solutions in 1,2,4-trichlorobenzene (TCB) containing 180 ppm butylated hydroxytoluene (BHT) and the solvent is sparged with nitrogen. A small amount of decane is added as a flow rate marker to the sample solution for GPC elution validation. Dissolution of the samples is completed by gentle stirring at 145° C. for four hours.

Sample Loading

Samples are injected via a heated transfer line to a fixed loop injector (Injection loop of 500 μL) directly onto the TREF column at 145° C.

Temperature Profile of TREF Column

After the sample has been injected onto the TREF column, the column is taken "off-line" and allowed to cool. The temperature profile of the TREF column is as follows: cooling down from 145° C. to 110° C. at 2.19° C./min, cooling down from 110° C. to 30° C. at 0.110° C./min, and thermal equilibrium at 30° C. for 16 minutes.

During elution, the column is placed back "on-line" to the flow path with a pump elution rate of 0.9 ml/min for 1.0 minute. The heating rate of elution is 0.119° C./min from 30° C. to 110° C.

Elution from TREF Column

The 16 fractions are collected from 30° C. to 110° C. at 5° C. increments per fraction. Each fraction is injected for GPC analysis. Each of the 16 fractions are injected directly from the TREF column over a period of 1.0 minute onto the GPC column set. The eluent is equilibrated at the same temperature as the TREF column during elution by using a temperature pre-equilibration coil (Gillespie and Li Pi Shan et al., Apparatus for Method for Polymer Characterization, WO2006081116). Elution of the TREF is performed by flushing the TREF column at 0.9 ml/min for 1.0 min. The first fraction, Fraction (30° C.), represents the amount of material remaining soluble in TCB at 30° C. Fraction (35° C.), Fraction (40° C.), Fraction (45° C.), Fraction (50° C.), Fraction (55° C.), Fraction (60° C.), Fraction (65° C.), Fraction (70° C.), Fraction (75° C.), Fraction (80° C.), Fraction (85° C.), Fraction (90° C.), Fraction (95° C.), Fraction (100° C.), and Fraction (105° C.) represent the amount of material eluting from the TREF column with a temperature range of 30.01 to 35° C., 35.01 to 40° C., 40.01 to 45° C., 45.01 to 50° C., 50.01 to 55° C., 55.01 to 60° C., 60.01 to 65° C., 65.01 to 70° C., 70.01 to 75° C., 75.01 to 80° C., 80.01 to 85° C., 85.01 to 90° C., 90.01 to 95° C., 95.01 to 100° C., and 100.01 to 105° C., respectively.

GPC Parameters

The cross fractionation instrument is equipped with one 20 μm guard column and four Mixed A-LS 20 μm columns (Varian Inc., previously PolymerLabs), and the IR-4 detector from PolymerChar (Spain) is the concentration detector. The GPC column set is calibrated by running twenty one narrow molecular weight distribution polystyrene standards. The molecular weight (MW) of the standards ranges from 580 to 8,400,000 g/mol, and the standards are contained in 6 "cocktail" mixtures. Each standard mixture ("cocktail") has at least a decade of separation between individual molecular weights. The standards are purchased from Polymer Laboratories (Shropshire, UK). The polystyrene standards are prepared at 0.005 g in 20 mL of solvent for molecular weights equal to or greater than 1,000,000 g/mol and 0.001 g in 20 mL of solvent for molecular weights less than 1,000,000 g/mol. The polystyrene standards are dissolved at 145° C. with gentle agitation for 30 minutes. The narrow standards mixtures are run first and in the order of decreasing highest molecular weight component to minimize degradation. A logarithmic molecular weight calibration is generated using a fourth-order polynomial fit as a function of elution volume. The polystyrene standard peak molecular weights are converted to polyethylene molecular weights using Equation 12 as described in Williams and Ward, J. Polym. Sci., Polym. Let., 6, 621 (1968): where M is the molecular weight, A has a value of 0.40 and B is equal to 1.0.

The plate count for the four Mixed A-LS 20 μm columns needs to be at least 19,000 by using a 200 μl injection volume of a 0.4 mg/ml solution of Eicosane in 1,2,4-Trichlorobenzene (TCB) bypassing the TREF column. The plate count calculates from the peak retention volume ($RV_{pk\,max}$) and the retention volume (RV) width at ½ height (50% of the chromatographic peak) to obtain an effective measure of the number of theoretical plates in the column by using Equation 14 (Striegel and Yau et al., "Modern Size-Exclusion Liquid Chromatography", Wiley, 2009, Page 86).

MWD Analysis for Each Fraction

The molecular weight distribution (MWD) of each fraction is calculated from the integrated GPC chromatogram to obtain the weight average molecular weight for each fraction, MW (Temperature).

The establishment of the upper integration limit (high molecular weight end) is based on the visible difference between the peak rise from the baseline. The establishment of the lower integration limit (low molecular weight end) is viewed as the return to the baseline or the point of the elution volume of the polystyrene narrow molecular weight standard of 3250 molecular weight (whichever is earlier).

The white noise level of the IR-4 detector is calculated from the IR-4 detector upon analyzing the GPC chromatogram before the upper integration limit (prior to polymer elution). The detector response at each acquisition time contributed from the polymer chains is first corrected for the baseline correction to obtain the baseline subtracted signal (IR(RV), RV is the elution volume of the GPC chromatogram). The baseline corrected IR-4 response is further corrected for white noise: IR(RV) is used in the GPC calculation only if IR(RV) is larger than the white noise value. In this work, a typical white noise for the IR is determined to be 0.35 mV while the whole-polymer (direct 0.50 mg GPC-injection on the GPC column bypassing the TREF column) peak height in mV is typically around 240 for a polyolefin polymer (high density polyethylene, polydispersity $M_w/M_n$ approximately 2.6). Care should be maintained to provide a signal to noise ratio (the peak height of whole polymer injection to the white noise) of at least 500 at 1.0 mg/ml 500 μL injection volume for a polyolefin polymer (high density polyethylene, polydispersity $M_w/M_n$ approximately 2.6).

The area of each individual GPC chromatogram corresponds to the amount of polyolefinic material eluted from the TREF fraction. The weight percentage of the TREF fraction at a specified temperature range of the Fraction, Wt % (Temperature), is calculated as the area of the individual GPC chromatogram divided by the sum of the areas of the 16 individual GPC chromatograms. The GPC molecular weight distribution calculations (Mn, Mw, and Mz) are performed on each chromatogram and reported only if the weight percentage of the TREF fraction is larger than 1.0 wt %. The GPC weight-average molecular weight, Mw, is reported as MW (Temperature) of each chromatogram.

Wt % (30° C.) represents the amount of material eluting from the TREF column at 30° C. during the TREF elution process. Wt % (35° C.), Wt % (40° C.), Wt % (45° C.), Wt % (50° C.), Wt % (55° C.), Wt % (60° C.), Wt % (65° C.), Wt % (70° C.), Wt % (75° C.), Wt % (80° C.), Wt % (85° C.), Wt % (90° C.), Wt % (95° C.), Wt % (100° C.), and Wt % (105° C.) represent the amount of material eluting from the TREF column with a temperature range of 30.01° C. to 35° C., 35.01° C. to 40° C., 40.01 to 45° C., 45.01° C. to 50° C., 50.01° C. to 55° C., 55.01° C. to 60° C., 60.01° C. to 65° C., 65.01° C. to 70° C., 70.01° C. to 75° C., 75.01° C. to 80° C., 80.01° C. to 85° C., 85.01° C. to 90° C., 90.01° C. to 95° C., 95.01° C. to 100° C., and 100.01° C. to 105° C., respectively. The cumulative weight fraction is defined as the sum of the Wt % of the fractions up to a specified temperature. The cumulative weight fraction is 1.00 for the whole temperature range.

The highest temperature fraction molecular weight, MW (Highest Temperature Fraction), is defined as the molecular weight calculated at the highest temperature containing more than 1.0 wt % material. The MW Ratio of each temperature is defined as the MW (Temperature) divided by MW (Highest Temperature Fraction).

Gel Content

Gel content is determined in accordance to ASTM D2765-01 Method A in xylene. The sample is cut to required size using a razor blade.

Film Testing Conditions

The following physical properties are measured on the films produced:

Total (Overall), Surface and Internal Haze: Samples measured for internal haze and overall haze are sampled and prepared according to ASTM D 1003. Internal haze was obtained via refractive index matching using mineral oil on both sides of the films. A Hazeguard Plus (BYK-Gardner USA; Columbia, Md.) is used for testing. Surface haze is determined as the difference between overall haze and internal haze.

45° Gloss: ASTM D-2457.

MD and CD Elmendorf Tear Strength: ASTM D-1922.

MD and CD Tensile Strength: ASTM D-882.

Dart Impact Strength: ASTM D-1709.

Puncture: Puncture is measured on an Instron Model 4201 with Sintech Testworks Software Version 3.10. The specimen size is 6 inch×6 inch and 4 measurements are made to determine an average puncture value. The film is conditioned for 40 hours after film production and at least 24 hours in an ASTM controlled laboratory. A 100 lb load cell is used with a round specimen holder. The specimen is a 4 inch circular specimen. The puncture probe is a ½ inch diameter polished stainless steel ball (on a 0.25 inch rod) with a 7.5 inch maximum travel length. There is no gauge length; the probe is as close as possible to, but not touching, the specimen. The crosshead speed used is 10 inches/minute. The thickness is measured in the middle of the specimen. The thickness of the film, the distance the crosshead traveled, and the peak load are used to determine the puncture by the software. The puncture probe is cleaned using a "Kimwipe" after each specimen.

Shrink tension is measured according to the method described in Y. Jin, T. Hermel-Davidock, T. Karjala, M. Demirors, J. Wang, E. Leyva, and D. Allen, "Shrink Force Measurement of Low Shrink Force Films", SPE ANTEC Proceedings, p. 1264 (2008).

% Free Shrink: A single layer square film with a dimension of 10.16 cm×10.16 cm is cut out by a punch press from a film sample along the edges of the machine direction (MD) and the cross direction (CD). The film is then placed in a film holder and the film holder is immersed in a hot-oil bath at 150° C. for 30 seconds. The holder is then removed from the oil bath. After oil is drained out, the length of film is measured at multiple locations in each direction and the average is taken as the final length. The % free shrink is determined from Equation 15.

We claim:

1. An ethylene-based polymer composition characterized by a Comonomer Distribution Constant greater than about 45 and as high as 400, wherein the composition has less than 120 total unsaturation unit/1,000,000 C, wherein the composition is further characterized as comprising a MW Ratio at each temperature is less than or equal to 1.00 for each fraction comprising more than 1.0 wt % which represents the area of the fraction divided by the total area of all fractions.

2. The composition of claim 1, wherein said composition is characterized by one of more of the followings:
   a. has a melt index of less than or equal to 0.90 g/10 min; and/or
   b. a density in the range between 0.92 g/cc and 0.945 g/cc.

3. The composition of claim 1, wherein the MW Ratio increases with the temperature of each fraction.

4. The composition of claim 1, wherein the MW Ratio is less than 0.10 for each temperature that is equal to or lower than 50° C.

5. The composition of claim 1, wherein the cumulative weight fraction is less than 0.10 for the fractions with a temperature up to 50° C.

6. The composition of claim 1, wherein the cumulative weight fraction is not less than 0.03 for the fractions with a temperature up to 85° C.

7. The composition of claim 1, wherein the composition is further characterized as comprising:
   (a) one Component A being 20-65 wt % of the composition with a MI less than 0.3 and has a higher density than Component B with a density difference between Component B and A of greater than 0.005 g/cc
   (b) Component B having a MI greater than that of Component A
   (c) With the overall polymer having a MI of less than or equal to 0.9 and a density of less than 0.945 g/cc and greater than 0.92 g/cc.

8. The polymer composition of claim 1, wherein the composition comprises up to about 3 long chain branches/1000 carbons.

9. The polymer composition of claim 1, having a ZSVR of at least 2.5.

10. The polymer composition of claim 1, having a ZSVR of at least 4.

11. The polymer of claim 1 further characterized by comprising less than 20 vinylidene unsaturation unit/1,000,000 C or comprising less than 20 trisubstituted unsaturation unit/1,000,000 C.

12. The polymer composition of claim 1, wherein the composition has a bimodal molecular weight distribution, or comprising a single DSC melting peak.

13. The composition of claim 1 wherein the composition has a comonomer distribution profile comprising a mono or bimodal distribution from 35° C. to 120° C., excluding the purge.

14. The polymer composition of claim 1 comprising Mw from about 80,000 to about 200,000 g/mol.

15. The polymer composition of claim 1 characterized as having a ratio of viscosity at 190° C. at 0.1 rad/s to a viscosity at 190° C. at 100 rad/s of greater than 8.5 as determined by dynamic mechanical spectroscopy.

16. The polymer composition of claim 1 characterized by at least one of the followings:
   a. having a phase angle of less than 65 degrees and greater than 0 degrees at a complex modulus of 10,000 Pa as determined by dynamic mechanical spectroscopy at 190° C.; and/or
   b. having a $M_w/M_n$ less than 10.

* * * * *